United States Patent
Higuchi et al.

(10) Patent No.: US 12,458,318 B2
(45) Date of Patent: Nov. 4, 2025

(54) LUNG SOUND ANALYSIS SYSTEM

(71) Applicant: NEC Corporation, Tokyo (JP)

(72) Inventors: Masao Higuchi, Tokyo (JP); Mitsuru Noma, Tokyo (JP); Reishi Kondo, Tokyo (JP); Yumi Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 18/020,793

(22) PCT Filed: Aug. 25, 2020

(86) PCT No.: PCT/JP2020/032056
§ 371 (c)(1),
(2) Date: Feb. 10, 2023

(87) PCT Pub. No.: WO2022/044128
PCT Pub. Date: Mar. 3, 2022

(65) Prior Publication Data
US 2023/0301616 A1    Sep. 28, 2023

(51) Int. Cl.
*A61B 7/00* (2006.01)
*A61B 7/04* (2006.01)

(52) U.S. Cl.
CPC ............... *A61B 7/003* (2013.01); *A61B 7/04* (2013.01)

(58) Field of Classification Search
CPC ........... A61B 7/003; A61B 5/087; A61B 7/04; A61B 5/7203; G16H 50/20
USPC .................................................. 381/67, 56
See application file for complete search history.

(56) References Cited

U.S. PATENT DOCUMENTS

| | | |
|---|---|---|
| 6,699,204 B1 | 3/2004 | Kehyayan et al. |
| 2010/0094102 A1 | 4/2010 | Zhang et al. |
| 2015/0157290 A1* | 6/2015 | Kawata ............ A61B 7/04 600/586 |

(Continued)

FOREIGN PATENT DOCUMENTS

| | | |
|---|---|---|
| JP | 2002-538921 A | 11/2002 |
| JP | 2007-190081 A | 8/2007 |

(Continued)

OTHER PUBLICATIONS

International Search Report for PCT Application No. PCT/JP2020/032056, mailed on Nov. 2, 2020.

*Primary Examiner* — Vivian C Chin
*Assistant Examiner* — Douglas J Suthers
(74) *Attorney, Agent, or Firm* — Sughrue Mion, PLLC

(57) ABSTRACT

A lung sound analysis system includes a storage means for storing therein the history of auscultation observations on lung sound data of each of auscultation positions of a subject who is a heart failure patient, a calculation means for calculating appearance frequency of abnormal sounds for each of the auscultation positions on the basis of the history, a determination means for determining the sequence of the auscultation positions at which lung sounds are to be auscultated from the subject, on the basis of the calculated appearance frequency, and an acquisition means for giving guidance on the auscultation positions of the subject to an operator according to the determined sequence, and acquiring time-series acoustic signals including lung sounds from a guided auscultation position. The system supports medical decision-making for healthcare professionals monitoring heart failure patients.

9 Claims, 14 Drawing Sheets

(56) References Cited

U.S. PATENT DOCUMENTS

| | | |
|---|---|---|
| 2017/0325779 A1 | 11/2017 | Spina et al. |
| 2019/0038216 A1* | 2/2019 | Ser .................. G16H 50/20 |
| 2019/0167205 A1 | 6/2019 | An et al. |
| 2020/0113514 A1 | 4/2020 | Den Brinker et al. |
| 2021/0133494 A1 | 5/2021 | Komatsu et al. |
| 2021/0256312 A1 | 8/2021 | Komatsu et al. |

FOREIGN PATENT DOCUMENTS

| | | |
|---|---|---|
| JP | 2008-113936 A | 5/2008 |
| JP | 4849424 B2 | 1/2012 |
| JP | 2012-504478 A | 2/2012 |
| JP | 2014-004018 A | 1/2014 |
| JP | 2015-188511 A | 11/2015 |
| JP | 2017-536905 A | 12/2017 |
| JP | 2020-513914 A | 5/2020 |
| WO | 2010/044452 A1 | 4/2010 |
| WO | 2019/220609 A1 | 11/2019 |
| WO | 2019/220620 A1 | 11/2019 |

* cited by examiner

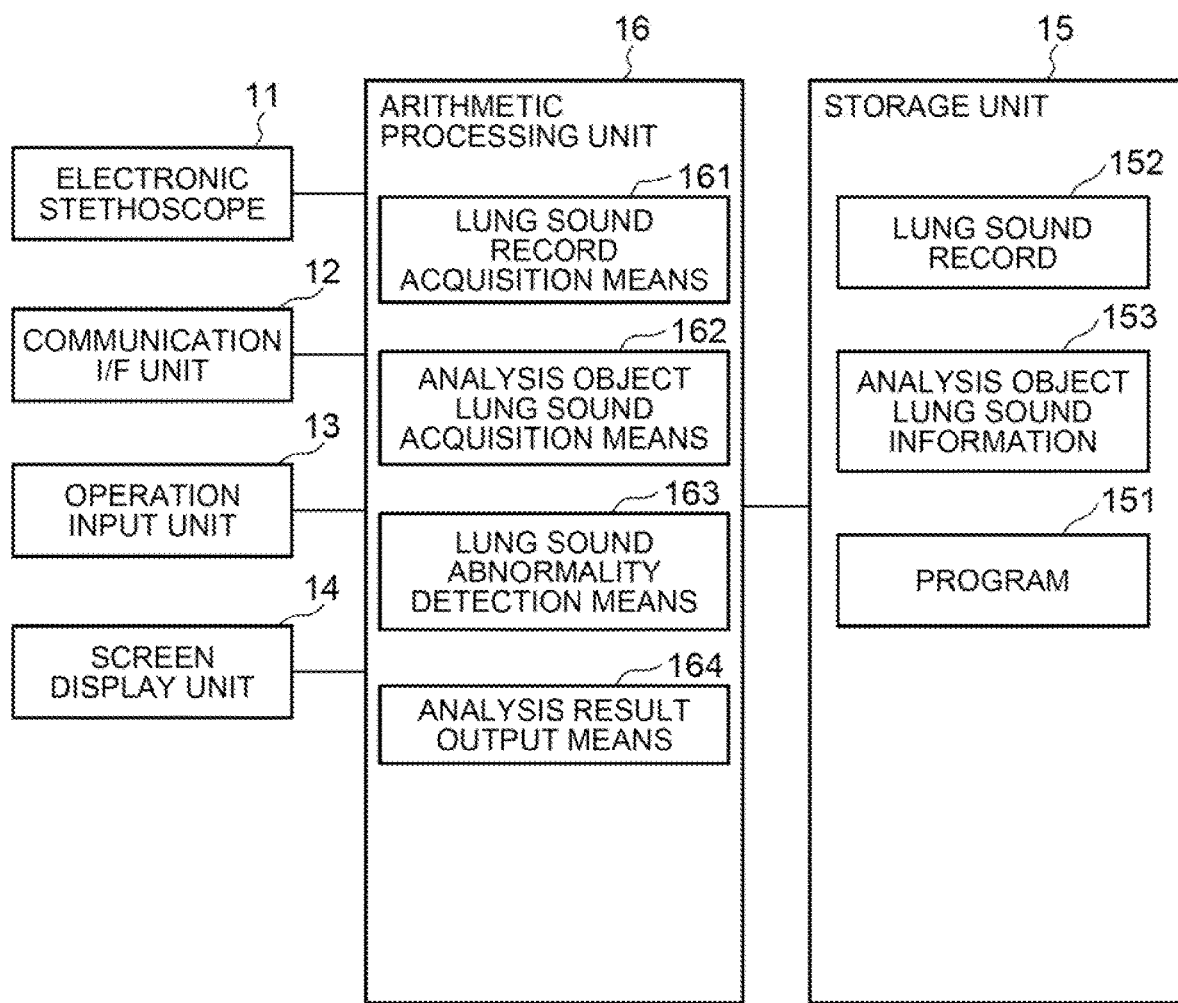

FIG. 2

| | | | |
|---|---|---|---|
| PATIENT ID | | | ~1521 |
| AUSCULTATION DATE/TIME | | | ~1522 |
| DOCTOR IN CHARGE | | | ~1523 |
| AUSCULTATION POSITION 1 | LUNG SOUND DATA 1 | AUSCULTATION OBSERVATION 1 | 1524 |
| | LUNG SOUND DATA 2 | AUSCULTATION OBSERVATION 2 | |
| | ⋮ | | |
| ⋮ | | | |
| AUSCULTATION POSITION 12 | LUNG SOUND DATA 1 | AUSCULTATION OBSERVATION 1 | 1524 |
| | LUNG SOUND DATA 2 | AUSCULTATION OBSERVATION 2 | |
| | ⋮ | | |
| AUSCULTATION DATE/TIME | | | |
| DOCTOR IN CHARGE | | | |
| AUSCULTATION POSITION 1 | LUNG SOUND DATA 1 | AUSCULTATION OBSERVATION 1 | |
| | LUNG SOUND DATA 2 | AUSCULTATION OBSERVATION 2 | |
| | ⋮ | | |
| ⋮ | | | |
| AUSCULTATION POSITION 12 | LUNG SOUND DATA 1 | AUSCULTATION OBSERVATION 1 | |
| | LUNG SOUND DATA 2 | AUSCULTATION OBSERVATION 2 | |
| | ⋮ | | |
| ⋮ | | | |
| AUSCULTATION DATE/TIME  (DISCHARGE DATE/TIME) | | | |
| DOCTOR IN CHARGE | | | |
| AUSCULTATION POSITION 1 | LUNG SOUND DATA 1 | AUSCULTATION OBSERVATION 1 | |
| | LUNG SOUND DATA 2 | AUSCULTATION OBSERVATION 2 | |
| | ⋮ | | |
| ⋮ | | | |
| AUSCULTATION POSITION 12 | LUNG SOUND DATA 1 | AUSCULTATION OBSERVATION 1 | |
| | LUNG SOUND DATA 2 | AUSCULTATION OBSERVATION 2 | |
| | ⋮ | | |
| INFORMATIVE MATTER AT DISCHARGE | | | ~1525 |
| CONTACT EMAIL ADDRESS | | | ~1526 |

152, 1527

POSTERIOR SIDE OF THE CHEST

ANTERIOR SIDE OF THE CHEST

FIG. 4

| 153 | | |
|---|---|---|
| PATIENT ID | | 1531 |
| ANALYSIS DATE/TIME | | 1532 |
| PERSON IN CHARGE | | 1533 |
| AUSCULTATION POSITION 1 | LUNG SOUND DATA 1 | ANALYSIS RESULT 1 |
| | LUNG SOUND DATA 2 | ANALYSIS RESULT 2 |
| | ⋮ | ⋮ |
| AUSCULTATION POSITION 12 | LUNG SOUND DATA 1 | ANALYSIS RESULT 1 |
| | LUNG SOUND DATA 2 | ANALYSIS RESULT 2 |
| | ⋮ | ⋮ |
| EMERGENCY LEVEL | | 1535 |
| INFORMATIVE MATTER AT ANALYSIS | | 1536 |

(1534 brackets the LUNG SOUND DATA and ANALYSIS RESULT columns)

FIG. 9

| AUSCULTATION POSITION | ABNORMALITY FREQUENCY | AUSCULTATION SEQUENCE 1 | AUSCULTATION SEQUENCE 2 |
|---|---|---|---|
| (1) | 1 | 8 | 9 |
| (2) | 1 | 9 | 10 |
| (3) | 1 | 10 | 11 |
| (4) | 1 | 11 | 12 |
| (5) | 2 | 4 | 8 |
| (6) | 3 | 3 | 7 |
| (7) | 1 | 7 | 5 |
| (8) | 0 | 12 | 6 |
| (9) | 2 | 5 | 3 |
| (10) | 2 | 6 | 4 |
| (11) | 4 | 1 | 1 |
| (12) | 3 | 2 | 2 |

FIG. 11

| AUSCULTATION POSITION | (1) | (2) | (3) | (4) | (5) | (6) | (7) | (8) | (9) | (10) | (11) | (12) |
|---|---|---|---|---|---|---|---|---|---|---|---|---|
| SEVERITY 0 | − | − | − | − | − | − | − | − | − | − | − | − |
| SEVERITY 1 | − | − | − | − | − | − | − | − | − | − | + | + |
| SEVERITY 2 | − | − | − | − | + | + | − | − | − | − | − | + |
| ...... | ...... | ...... | ...... | ...... | ...... | ...... | ...... | ...... | ...... | ...... | ...... | ...... |
| SEVERITY N | + | + | + | + | + | + | + | + | + | + | + | + |

FIG. 12

| | | | 1531 | 1532 | 1533 | 1534 | 1535 | 1536 |

| 153 | | | |
|---|---|---|---|
| PATIENT ID | | | |
| ANALYSIS DATE/TIME | | | |
| PERSON IN CHARGE | | | |
| AUSCULTATION POSITION 1 | LUNG SOUND DATA 1 | ANALYSIS RESULT 1 | AUSCULTATION OBSERVATION 1 |
| | LUNG SOUND DATA 2 | ANALYSIS RESULT 2 | AUSCULTATION OBSERVATION 2 |
| | ⋮ | ⋮ | |
| AUSCULTATION POSITION 12 | LUNG SOUND DATA 1 | ANALYSIS RESULT 1 | AUSCULTATION OBSERVATION 1 |
| | LUNG SOUND DATA 2 | ANALYSIS RESULT 2 | AUSCULTATION OBSERVATION 2 |
| | ⋮ | ⋮ | |
| EMERGENCY LEVEL | | | |
| INFORMATIVE MATTER AT ANALYSIS | | | |

LUNG SOUND ANALYSIS SYSTEM

This application is a National Stage Entry of PCT/JP2020/032056 filed on Aug. 25, 2020, the contents of all of which are incorporated herein by reference, in their entirety.

TECHNICAL FIELD

The present invention relates to a lung sound analysis system, a lung sound analysis method, and a storage medium, for supporting diagnosis of heart failure.

BACKGROUND ART

Heart failure is a clinical syndrome in which as a result that cardiac dysfunction, that is, an organic and/or functional dysfunction, occurred in the heart and compensation mechanism of a heart pump function failed, dyspnea, malaise, or an edema appears, which is accompanied by a drop of exercise tolerability. A patient who suffered from heart failure always has a risk of exacerbation even though the patient has been treated and reached remission. When acute exacerbation occurs in the patient due to excessive water or salt intake, forgetting to take medicines, too much exercise, and the like, the patient must be hospitalized again. Therefore, it is important to prevent acute exacerbation by finding heart failure exacerbation of a patient discharged from hospital in an early stage and giving treatment intervention.

One method of diagnosing heart failure is a lung sound examination by auscultation. Such an examination is a method usable for diagnosing health condition of lungs and also heart failure, in a safe and easy manner. However, it is difficult for those other than skilled medical specialists to obtain a detailed and accurate diagnosis result. Therefore, in the rounds by general nurses or caring staff and in the visiting care sites, it is impossible to obtain a detailed diagnosis.

In order to cope with such a problem, a system has been proposed (for example, see Patent Literatures 1 to 6). The system automatically determines presence or absence of abnormal sounds called adventitious sounds in the lung sounds collected by an electronic stethoscope.

Patent Literature 1: JP 2014-4018 A
Patent Literature 2: JP 2002-538921 A
Patent Literature 3: JP 2017-536905 A
Patent Literature 4: WO 2010/044452 A
Patent Literature 5: JP 2008-113936 A
Patent Literature 6: JP 4849424 B
Patent Literature 7: WO 2019/220609 A
Patent Literature 8: WO 2019/220620 A
Patent Literature 9: JP 2007-190081 A

SUMMARY

The sequence of auscultation positions to which a stethoscope is to be may be fixed in advance (for example, Patent Literature 1) or may be changed arbitrarily depending on the preference or habits of nurses or the like (for Example, Patent Literature 6). However, in either configuration, when auscultation is terminated at the point of time when auscultation at some auscultation positions, among the auscultation positions, has been completed due to any reasons such as circumstances of the patient, there is high possibility that heart failure exacerbation is overlooked.

An object of the present invention is to provide a lung sound analysis system that solves the above-described problem.

A lung sound analysis system, according to one aspect of the present invention, is configured to include
  a storage means for storing history of auscultation observations on lung sound data of each of auscultation positions of a subject who is a heart failure patient,
  a calculation means for calculating appearance frequency of abnormal sounds for each of the auscultation positions on the basis of the history;
  a determination means for determining the sequence of the auscultation positions at which lung sounds are to be auscultated from the subject, on the basis of the calculated appearance frequency; and
  an acquisition means for giving guidance on the auscultation positions of the subject to an operator according to the determined sequence, and acquiring time-series acoustic signals including lung sounds from a guided auscultation position.

A lung sound analysis method, according to another aspect of the present invention, is configured to include
  storing history of auscultation observations on lung sound data of each of auscultation positions of a subject who is a heart failure patient,
  calculating appearance frequency of abnormal sounds for each of the auscultation positions on the basis of the history,
  determining the sequence of the auscultation positions at which lung sounds are to be auscultated from the subject, on the basis of the calculated appearance frequency, and
  giving guidance on the auscultation positions of the subject to an operator according to the determined sequence, and acquiring time-series acoustic signals including lung sounds from a guided auscultation position.

A computer-readable medium, according to another aspect of the present invention, is configured to store thereon a program for causing a computer to execute processing to
  store history of auscultation observations on lung sound data of each of auscultation positions of a subject who is a heart failure patient;
  calculate appearance frequency of abnormal sounds for each of the auscultation positions on the basis of the history;
  determine the sequence of the auscultation positions at which lung sounds are to be auscultated from the subject, on the basis of the calculated appearance frequency; and
  give guidance on the auscultation positions of the subject to an operator according to the determined sequence, and acquire time-series acoustic signals including lung sounds from a guided auscultation position.

Since the present invention has the configurations as described above, when auscultation is terminated at a point of time when auscultation at some auscultation positions, among the auscultation positions, has been completed due to any reasons such as circumstances of the patient, a probability that heart failure exacerbation is overlooked can be reduced.

BRIEF DESCRIPTION OF DRAWINGS

FIG. 1 is a block diagram of a lung sound analysis device according to a first exemplary embodiment of the present invention.

FIG. 2 is a diagram illustrating an exemplary configuration of a lung sound record stored in the lung sound analysis device according to the first exemplary embodiment of the present invention.

FIG. 4 is a diagram illustrating an exemplary configuration of analysis object lung sound information stored in the lung sound analysis device according to the first exemplary embodiment of the present invention.

FIG. 9 illustrates examples of abnormality frequency at each auscultation position of a patient and the auscultation sequence determined based on the abnormality frequency, calculated by the lung sound analysis device according to the first exemplary embodiment of the present invention.

FIG. 11 illustrates an example of a determination table for determining the severity of heart failure from an analysis result of lung sound data for each auscultation position by the lung sound analysis device according to the first exemplary embodiment of the present invention.

FIG. 12 is a diagram illustrating an exemplary configuration of analysis object lung sound information in which auscultation observations by a medical specialist are recorded, stored in the lung sound analysis device according to the first exemplary embodiment of the present invention.

EXEMPLARY EMBODIMENTS

Figure 3:
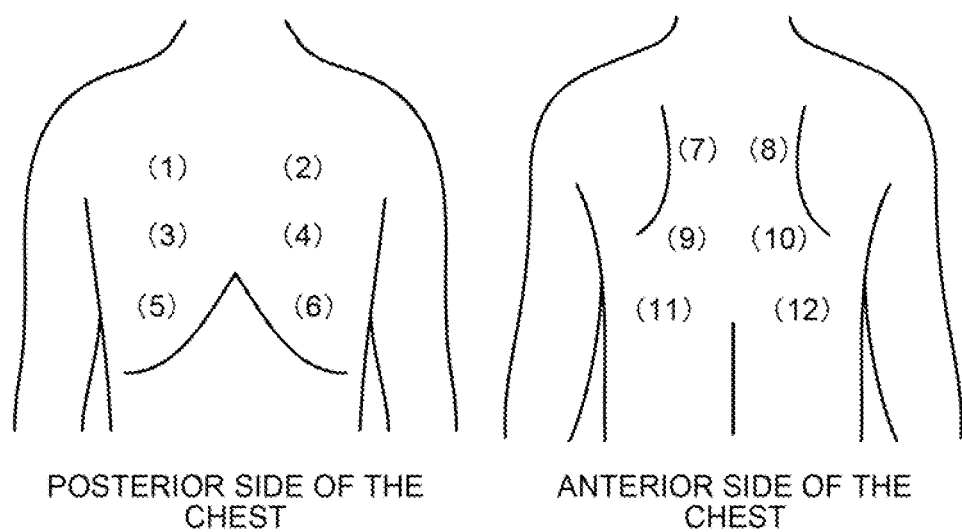
FIG. 3 illustrates auscultation positions (1) to (12) of examination by an electronic stethoscope in the lung sound analysis device according to the first exemplary embodiment of the present invention.

Next, exemplary embodiments of the present invention will be described with reference to the drawings.

First Exemplary Embodiment

FIG. 1 is a block diagram of a lung sound analysis device 10 according to a first exemplary embodiment of the present invention. The lung sound analysis device 10 is an information processing device that acquires lung sounds from a patient who received treatment for heart failure and was discharged from hospital, and analyzes them. The lung sound analysis device 10 may be a smartphone, a tablet terminal, a personal digital assistant (PDA), a laptop personal computer, or the like, but is not limited thereto.

Hereinafter, a patient whose lung sounds are to be analyzed using the lung sound analysis device 10 is referred to as a patient A.

The lung sound analysis device 10 includes an electronic stethoscope 11, a communication I/F unit 12, an operation input unit 13, a screen display unit 14, a storage unit 15, and an arithmetic processing unit 16.

The electronic stethoscope 11 is configured to convert the lung sounds of the patient A, obtained when the chest piece of the stethoscope is attached to the posterior side of the chest or the anterior side of the chest of the patient A, into digital signals, and transfer them to the arithmetic processing unit 16 in a wireless or wired manner.

The communication I/F unit 12 is configured of, for example, a dedicated data communication circuit, and is configured to perform data communication with various devices such as a server device connected in a wired or wireless manner.

The operation input unit 13 includes operation input devices such as a keyboard and a mouse, and is configured to detect an operation by an operator and output it to the arithmetic processing unit 16. An operator is a person who performs an operation of obtaining the lung sounds of the patient A by using the lung sound analysis device 10. An operator may be, for example, a medical professional other than a doctor such as a nurse, caring staff such as a care worker, or family of the patient A.

The screen display unit 14 is configured of a screen display device such as a liquid crystal display (LCD) or a plasma display panel (PDP), and is configured to display, on a screen, various types of information such as an analysis result according to an instruction from the arithmetic processing unit 16.

The storage unit 15 includes storage devices such as a hard disk and a memory, and is configured to store processing information and a program 151 necessary for various types of processing to be performed in the arithmetic processing unit 16.

The program 151 is a program that is read and executed by the arithmetic processing unit 16 to thereby implement various processing units. The program 151 is read, in advance, from an external device (not illustrated) or a storage medium (not illustrated) via a data input and output function of the communication I/F unit 12 or the like, and is stored in the storage unit 15.

The main processing information stored in the storage unit 15 includes a lung sound record 152 and analysis object lung sound information 153.

The lung sound record 152 is a record of lung sounds of the patient A. The lung sound record 152 is generated based on a record of medical practice including auscultation performed on the patient A in hospital for heart failure treatment until discharge from the hospital, and is recorded on the storage unit 15 of the lung sound analysis device 10 when the patient A is discharged from the hospital. FIG. 2 illustrates an exemplary configuration of the lung sound record 152. In this example, the lung sound record 152 is configured of a patient ID 1521, one or more pieces of auscultation information 1527, an informative matter at discharge 1525, and a contact email address 1526. In the field of patient ID 1521, an ID uniquely identifying the patient A is set.

The field of auscultation information 1527 is configured of auscultation date/time 1522, a doctor in charge 1523, and lung sound information 1524. In the field of auscultation date/time 1522, the date/time on which diagnosis including auscultation is performed is recorded. The fields of one or more pieces of auscultation information 1527 are aligned in the descending order of the auscultation date/time 1522. The auscultation information 1527 at the bottom (at the time of auscultation immediately before the informative matter at discharge 1525) is the information of the patient A at the time of discharge from hospital. In the field of the doctor in charge 1523, the name of the doctor who made a diagnosis is recorded.

The field of lung sound information 1524 is provided for each auscultation position. The auscultation position is a location on the patient body on which a chest piece of a stethoscope for auscultating the lung sounds is put. That is, the auscultation position is a position for acquiring the lung sounds. In the example of FIG. 2, twelve positions in total from an auscultation position (1) to an auscultation position (12) are set (in FIG. 2, auscultation positions (2) to (11) are omitted). FIG. 3 is a schematic diagram for explaining the auscultation positions (1) to (12).

Referring to FIG. 3, the auscultation positions (1) and (2) are set at left and right of the upper lung field in the posterior side of the chest. The auscultation positions (3) and (4) are set at left and right of the middle lung field in the posterior side of the chest. The auscultation positions (5) and (6) are set at left and right of the lower lung field in the posterior side of the chest. The auscultation positions (7) and (8) are set at left and right of the upper lung field in the anterior side of the chest. The auscultation positions (9) and (10) are set at left and right of the middle lung field in the anterior side of the chest. The auscultation positions (11) and (12) are set at left and right of the lower lung field in the anterior side of the chest. The auscultation positions are not limited to the number and the positions described above. For example, not only the posterior side of the chest and the anterior side of the chest, it is also acceptable to set auscultation positions in the upper lung field, the middle lung field, and the lower lung field of the left and right sides of the chest to have eighteen positions in total. Alternatively, some of the above-described auscultation positions may be excluded. For example, it is acceptable to exclude the auscultation positions (3) to (6), (9), and (10) to thereby limit the positions to six positions in total, that is, the auscultation positions (1), (2), (7), (8), (11), and (12).

Referring to FIG. 2 again, the field of lung sound information 1524 for each auscultation position includes at least one set of a lung sound data field and an auscultation observation field. In the lung sound data field, digital time-series acoustic signals including lung sounds obtained by an electronic stethoscope from an auscultation position of the patient A are recorded. The posture of the patient at the time of auscultation is roughly classified into a lying position and a sitting position. The auscultation of the posterior side of the chest and the anterior side of the chest is generally performed in a sitting position. The signal length of one piece of lung sound data (for example, lung sound data 1) may have any length. For example, one piece of lung sound data may include signals of consecutive N times of breathing of the patient A. Here, N represents a positive integer of 1 or larger. The lung sound data may be signals to which processing such as removal of time-series acoustic signals in the period of pause phase, noise removal, and application of breath timing is performed on the time-series acoustic signals obtained from an electronic stethoscope.

In the auscultation observation field, the auscultation observation by a medical specialist on the lung sound data is recorded. In the auscultation observation, presence or absence of an abnormal lung sound and the type of abnormal sound if any (rales or the like) are recorded. Most of heart failure patients leave hospital in a remission state after receiving a heart failure treatment. Therefore, the lung sounds at the time of discharge from hospital are normal in most patients. However, there is a case where a patient is discharged from hospital in a mild case for certain reasons of the patient. In such a case, the patient is not in remission although in a mild case, so that the lung sounds at some auscultation positions may be abnormal.

In the field of the informative matter at discharge 1525, information such as weight of the patient A at the discharge from hospital is recorded.

In the field of the contact email address 1526, at least one email address of a person to whom an analysis result is to be sent is recorded. The contact email address may be an email address of the hospital where the patient is hospitalized, a medical specialist of heart failure, the family doctor of the patient A, or the like. Note that the method of sending an analysis result is not limited to email, and may be another communication method such as a messaging function of groupware, business chat, or the like.

Referring to FIG. 1 again, in the analysis object lung sound information 153, the lung sound information obtained from the patient A by using the electronic stethoscope 11 after the discharge from hospital and the analysis result thereof are recorded. FIG. 4 illustrates an exemplary configuration of the analysis object lung sound information 153. In this example, the analysis object lung sound information 153 is configured of a patient ID 1531, analysis date/time 1532, a person in charge 1533, lung sound information 1534, an emergency level 1535, and an informative matter at analysis 1536.

In the field of patient ID 1531, an ID uniquely identifying the patient A recorded in the field of patient ID 1521 of the lung sound record 152 is recorded. In the field of analysis date/time 1532, date/time on which the lung sounds of the patient A were acquired and analyzed is recorded. In the field of person in charge 1533, an ID uniquely identifying an operator who performed an operation of obtaining the lung sounds of the patient A is recorded.

The field of lung sound information 1534 is provided for each auscultation position. In the example of FIG. 4, twelve positions in total from the auscultation position (1) to the auscultation position (12), described with reference to FIG. 3, are set (in FIG. 4, the auscultation positions (2) to (11) are omitted). The field of lung sound information 1534 for each auscultation position includes at least one set of a lung sound data field and an analysis result field. In the lung sound data field, digital time-series acoustic signals including lung sounds obtained by the electronic stethoscope 11 from the auscultation position of the patient A are recorded. The signal length of one piece of lung sound data (for example, lung sound data 1) may have any length. For example, one piece of lung sound data may include signals of consecutive N times of breathing of the patient A. Here, N represents a positive integer of 1 or larger. The lung sound data may be signals to which processing such as removal of time-series acoustic signals in a period of pause phase, noise removal, and application of breath timing is performed on the time-series acoustic signals obtained from the electronic stethoscope 11.

The analysis result field contains a result of mechanically analyzing the lung sound data. In the analysis result, a numerical value indicating whether or not the lung sound data is abnormal lung sound data is recorded. For example, the analysis result field may contain a binary value, that is, a value 0 indicating normal lung sounds or a value 1 indicating abnormal lung sounds. Alternatively, the analysis result field may contain a numerical value representing the abnormal degree of the lung sound data. Regarding the abnormal degree, an abnormal degree that is equal to or less than a preset threshold represents that the lung sound data is normal lung sounds, and an abnormal degree exceeding the threshold represents that the lung sound data is abnormal lung sounds.

The field of emergency level 1535 contains an emergency level calculated by comprehensively determining the respective analysis results of the auscultation positions (1) to (12). The emergency level is an index indicating how seriously the patient condition is emergent. In other words, the emergency level is an index indicating a degree of time allowance that can prevent or reduce a crisis of readmission into hospital due to acute exacerbation by performing appropriate heart failure treatment within some time. By including such an emergency level in the analysis result, it is possible to take action according to the emergency level by a medical professional or the like who recognizes the analysis result.

The field of informative matter at analysis 1536 contains the conditions of the patient A on the analysis date. The conditions of the patient A include, for example, weight, blood pressure, pulse, subjective symptoms (short breath when goes out, edema, cough, anorexia, and the like), medication, and water intake amount.

Referring to FIG. 1 again, the arithmetic processing unit 16 includes a microprocessor such as a CPU and the peripheral circuits thereof, and is configured to read and execute the program 151 from the storage unit 15 to allow the hardware and the program 151 to cooperate with each other to thereby implement the various processing units. The main processing units implemented by the arithmetic processing unit 16 include a lung sound record acquisition means 161, an analysis object lung sound acquisition means 162, a lung sound abnormality detection means 163, and an analysis result output means 164.

The lung sound record acquisition means 161 is configured to acquire the lung sound record 152 of the patient A from an external device (not illustrated) or a storage medium (not illustrated) via a data input/output function of the communication I/F unit 12 or the like, and record it on the storage unit 15. In this example, it is assumed that when the patient A is discharged from hospital, the lung sound record 152 of the patient A has been generated in the medical server or the like of the hospital. However, the lung sound record acquisition means 161 may generate the lung sound record 152 by extracting necessary information from the medical record including auscultation of the patient A stored in the medical server or the like, and store it in the storage unit 15.

The analysis object lung sound acquisition means 162 is configured to acquire digital time-series acoustic signals including the lung sounds of the patient A after the discharge from hospital and other information. The analysis object lung sound acquisition means 162 acquires the digital time-series acoustic signals including the lung sounds of the patient A from the electronic stethoscope 11, in accordance with an instruction by the operator input from the operation input unit 13 or the like. As other information, the analysis object lung sound acquisition means 162 acquires information of the patient ID, the analysis date/time, the person in charge, and the informative matter at analysis, from the operator via the operation input unit 13 or from the lung sound record 152 stored in the storage unit 15. The analysis object lung sound acquisition means 162 also generates the analysis object lung sound information 153 from the acquired digital time-series acoustic signals and the other information, and stores it in the storage unit 15. The analysis object lung sound information 153 to be stored in the storage unit by the analysis object lung sound acquisition means 162 is configured to have a format as illustrated in FIG. 4 for example. At the time of storage by the analysis object lung sound acquisition means 162, the field of each analysis result of the lung sound information 1534 and the field of the emergency level 1535 have a NULL value.

The lung sound abnormality detection means 163 is configured to detect whether or not the lung sound data is abnormal lung sounds. There are various methods for detecting abnormality in the lung sounds. In the present embodiment, the lung sound abnormality detection means 163 uses an abnormality detection method based on a normal model in which normal sounds are learned in advance and sounds not falling under such a range is detected as abnormal sounds. The lung sound abnormality detection means 163 is configured to read the lung sound record 152 from the storage unit 15, generate a normal model for analyzing the lung sound data for each auscultation position of the patient A on the basis of the lung sound data of each auscultation position at the time of discharge from hospital of the patient A recorded in the lung sound record 152, and store the normal model. The lung sound abnormality detection means 163 is also configured to read the analysis object lung sound information 153 from the storage unit 15, analyze the lung sound data of each auscultation position of the patient A recorded in the analysis object lung sound information 153 by using the normal model, and record the analysis result in the field of analysis result of the lung sound record 152 of each auscultation position. The lung sound abnormality detection means 163 is also configured to calculate the emergency level on the basis of the analysis result of the lung sound data of each auscultation position, and record it in the field of the emergency level 1535.

The analysis result output means 164 is configured to read the analysis object lung sound information 153 from the storage unit 15, and display the analysis object lung sound information 153 on the screen display unit 14. The analysis result output means 164 is also configured to send an email to which the analysis object lung sound information 153 read from the storage unit 15 is attached as a file, to the contact email address 1526 of the lung sound record 152 via the communication I/F unit 12, in accordance with an instruction from the operation input unit 13 or automatically.

Next, operation of the lung sound analysis device 10 will be described. The operation of the lung sound analysis device 10 is roughly classified into a previous operation and an analysis operation to be performed thereafter.

Figure 5:
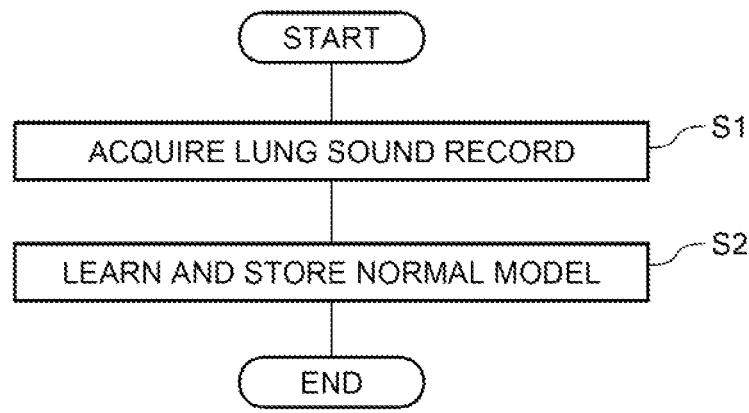
FIG. 5 is a flowchart illustrating an example of a previous operation of the lung sound analysis device according to the first exemplary embodiment of the present invention.

First, a previous operation will be described. FIG. 5 is a flowchart showing an example of a previous operation. The previous operation is performed in a specialized hospital where the patient A is in, on the discharge day of the patient A. Alternatively, the previous operation may be performed after the discharge from hospital before the start of the first analysis operation, at home of the patient A. The previous operation is started when the lung sound record acquisition means 161 is activated by operation of the start button of the previous operation shown on the screen display unit 14, for example.

Referring to FIG. 5, when the lung sound record acquisition means 161 is activated, it acquires the lung sound record 152 of the patient A from an external device (not illustrated) or a storage medium (not illustrated) via a data input/output function of the communication I/F unit 12 or the like, and records it on the storage unit 15 (step S1). FIG. 2 illustrates an exemplary configuration of the lung sound record 152 acquired in this manner. The lung sound record 152 includes at least the lung sound data and the auscultation observations of the patient A at the time of discharge from hospital.

Upon completion of the above-described operation by the lung sound record acquisition means 161, a model learning function of the lung sound abnormality detection means 163 is activated automatically or according to an instruction from the operation input unit 13. When the model learning function is activated, the lung sound abnormality detection means 163 reads the lung sound record 152 from the storage unit 15, learns the normal model on the basis of the lung sound data and the auscultation observations of the patient A at the time of discharge from hospital, and internally stores the normal model after the learning (step S2).

Figure 6:
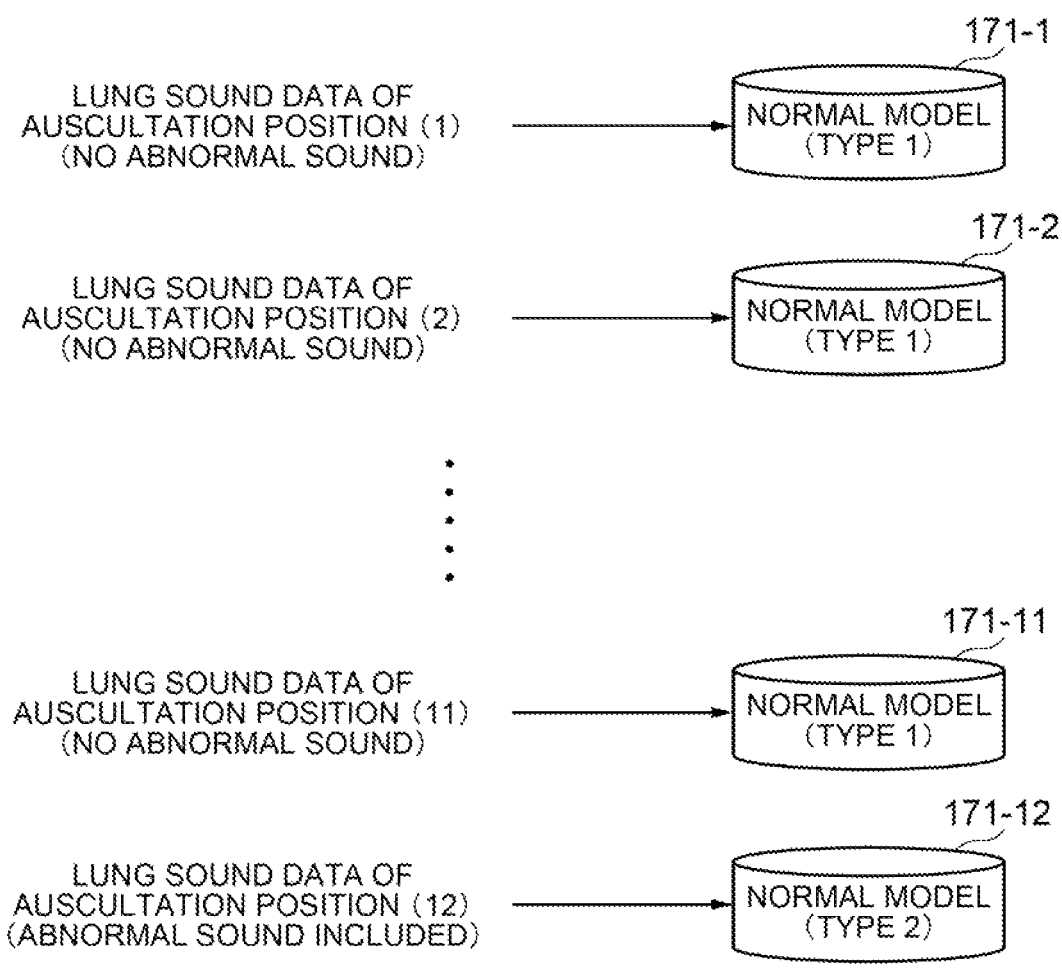
FIG. 6 illustrates a model learning function of a lung sound abnormality detection means in the lung sound analysis device according to the first exemplary embodiment of the present invention.

FIG. 6 illustrates the model learning function of the lung sound abnormality detection means 163. Referring to FIG. 6, the lung sound abnormality detection means 163 reads the auscultation information 1527 of the patient A at the time of discharge from hospital from the lung sound record 152, first performs machine learning by using the lung sound data of the auscultation position (1) as lung sound data in a normal condition, and creates a normal model 171-1 corresponding to the auscultation position (1). Specifically, the lung sound abnormality detection means 163 extracts a predetermined feature amount for identification from the lung sound data of the auscultation position (1). The feature amount may be one based on the energy of the lung sound signals, one based on the spectrum, a mel-frequency cepstrum coefficient (MFCC) or a discrete cosine transfer coefficient (DCTC) computed from the spectrum, or the like. Then, the lung sound abnormality detection means 163 models the extracted feature amount. As a generated model, Gaussian mixture model (GMM), one-class SVM, denoising auto-encoder with bidirectional LSTM that is a type of deep neural network (DNN), k-nearest neighbor algorithm (kNN), or the like may be used. Note that the abnormal detecting method using the normal sounds is not limited to those mentioned above. For example, a method of detecting abnormality from acoustic signals generated by the generation mechanism involving a condition change, described in Patent Literature 7 and 8, may be used. Then, when the auscultation observation of the auscultation position (1) describes that there is no abnormal sound in the lung sounds, the lung sound abnormality detection means 163 manages the generated normal model 171-1 as a type 1 normal model. On the contrary, when the auscultation observation of the auscultation position (1) describes that there is an abnormal sound in the lung sounds, the lung sound abnormality detection means 163 manages the generated normal model 171-1 as a type 2 normal model. In the example of FIG. 6, the normal model 171-1 is generated as the type 1 normal model.

The lung sound abnormality detection means 163 generates normal models 171-2 to 171-12 corresponding to the auscultation positions (2) to (12) by the same method as that used to generate the normal model 171-1, on the basis of the lung sound data and the auscultation observations of the auscultation positions (2) to (12) recorded in the auscultation information 1527 of the patient A at the time of discharge from hospital. In the example of FIG. 6, the normal models 171-2 to 171-11 are generated as type 1 normal models, and the normal model 171-12 is generated as a type 2 normal model.

The normal model of each auscultation position may be a single model or a plurality of models obtained by machine learning from different viewpoints. For example, it is possible to divide the lung sounds of the same auscultation position into a lung sound portion of the inspiratory phase, a lung sound portion of the expiratory phase on the basis of the breath timing, and a portion other than those (that is, pause phase), to generate a normal model obtained through learning by using the lung sound portion of the inspiratory phase and a normal model obtained through learning by using the lung sound portion of the expiratory phase. Further, it is also possible to learn one ore more normal models that are common to a plurality of auscultation positions in which it is recorded that there is no abnormality in the lung sounds in the auscultation observations. Furthermore, as the normal lung sound data to be used for learning normal models, in addition to the normal lung sound data of the patient A at the time of discharge from hospital, it is also possible to use normal lung sound data of the patient A before it or use normal lung sound data of a person other than the patient A.

Figure 7:
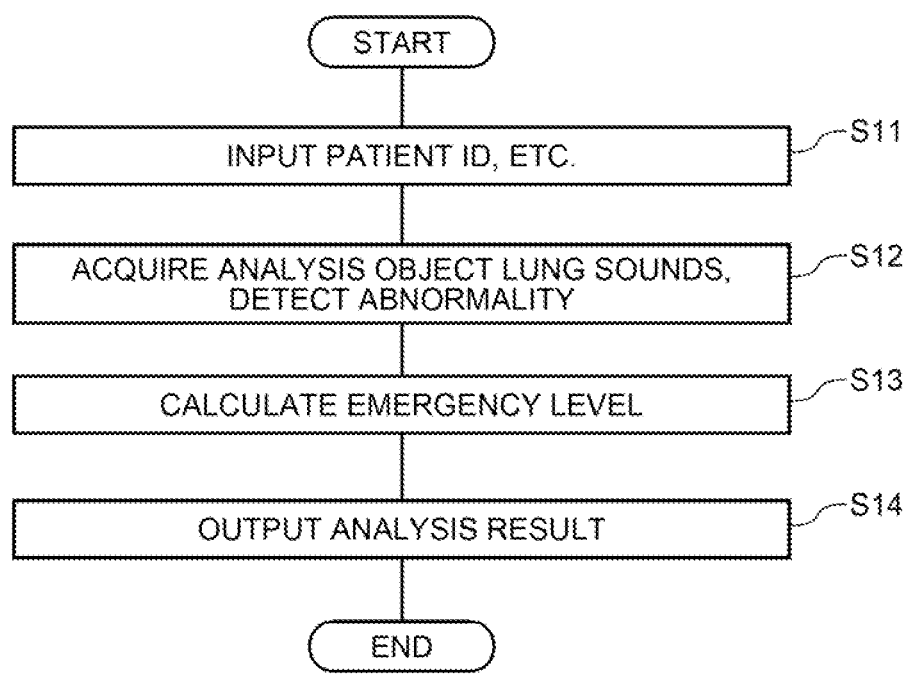
FIG. 7 is a flowchart illustrating an example of an analysis operation of the lung sound analysis device according to the first exemplary embodiment of the present invention.

Next, the analysis operation will be described. FIG. 7 is a flowchart showing an example of the analysis operation. The analysis operation is performed at a place other than a specialized hospital, such as home of the patient A. However, the analysis operation may be used to assist diagnosis performed by a doctor at a specialized hospital or the like. The analysis operation is started when the analysis object lung sound acquisition means 162 is activated by operation of the start button of the analysis operation shown on the screen display unit 14, for example.

Referring to FIG. 7, when activated, the analysis object lung sound acquisition means 162 creates the analysis object lung sound information 153 in which necessary matters are put in the respective fields of the patient ID 1531, the analysis date/time 1532, the person in charge 1533, and the informative matter at analysis 1535, and a NULL value is put in the other fields, and store it in the storage unit 15 (step S11). For example, the analysis object lung sound acquisition means 162 acquires the patient ID 1531 from the patient ID 1521 of the lung sound record 152 stored in the storage unit 15. The analysis object lung sound acquisition means 162 also acquires the analysis date/time 1532, the person in charge 1533, and the informative matter at analysis 153 from the operator via the operation input unit 13.

Then, the analysis object lung sound acquisition means 162 acquires digital time-series acoustic signals including the lung sounds of each auscultation position of the patient A from the electronic stethoscope 11, and records it in the analysis object lung sound information 153 in association with the auscultation position (step S12). Any method may be used to acquire the lung sounds of each auscultation position of the patient by the electronic stethoscope and record it in association with the auscultation position. For example, as described in Patent Literature 1, 4, 6 or the like, a method in which a guidance screen for giving guidance on the auscultation position to an operator who uses the electronic stethoscope 11 is shown on the screen display unit 14, or the like may be used. Moreover, at step S12, the lung sound abnormality detection means 163 reads the analysis object lung sound information 153 from the storage unit 15, analyzes the lung sound data of each auscultation position of the patient A recorded in the lung sound information 1534 of the analysis object lung sound information 153 by using the normal model created in advance, and records the analysis result in the field of analysis result for each auscultation position of the lung sound information 1534. Furthermore, at step S12, the analysis result output means 164 appropriately displays the analysis result performed by the lung sound abnormality detection means 163 on the screen display unit 14.

Then, the lung sound abnormality detection means 163 calculates the emergency level 1535 on the basis of the analysis result of the lung sound data of each auscultation position, and records it in the field of the emergency level 1535 of the analysis object lung sound information 153 (step S13). Then, the analysis result output means 164 reads the analysis object lung sound information 153 from the storage unit 15, displays the analysis object lung sound information 153 on the screen display unit 14, and sends an email to which the analysis object lung sound information 153 is attached as a file, to the contact email address 1526 of the lung sound record 152 via the communication I/F unit 12 (step S14). Note that the analysis result output means 164 may transmit the analysis object lung sound information 153 only when the emergency level 1535 exceeds a predetermined threshold.

Figure 8:
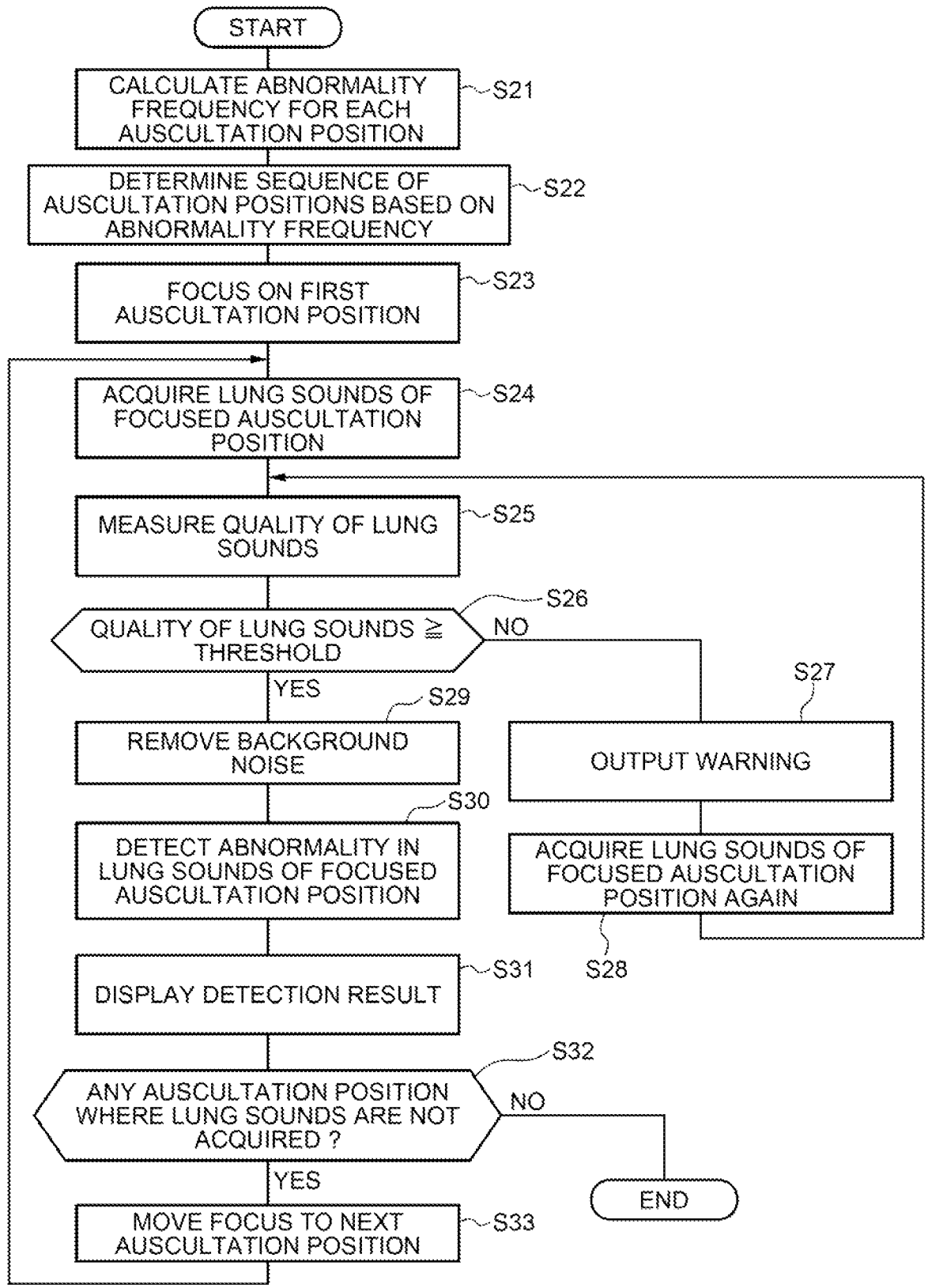
FIG. 8 is a flowchart illustrating details of the analysis operation of the lung sound analysis device according to the first exemplary embodiment of the present invention.

Next, the details of step S12 for performing acquisition of analysis object lung sounds and detection of abnormality will be described with reference to the flowchart of FIG. 8. FIG. 8 is a flowchart showing an example of a detailed procedure of step S12 of FIG. 7.

Referring to FIG. 8, the analysis object lung sound acquisition means 162 calculates the frequency of appearance of an abnormal sound for each auscultation position, on the basis of presence or absence of an abnormal sound recorded in the auscultation observation of each auscultation position in one or more pieces of the auscultation information 1527 recorded in the lung sound record 152 of the patient A (step S21). Specifically, first, the analysis object lung sound acquisition means 162 initializes the frequency counter of each of the auscultation positions (1) to (12) to zero. Then, the analysis object lung sound acquisition means 162 focuses on the auscultation information 1527 in which the auscultation date/time recorded in the lung sound record 152 is the date/time of discharge from hospital. Then, when there is at least one auscultation observation describing presence of an abnormal sound in the auscultation observations recorded for the auscultation position (1), the analysis object lung sound acquisition means 162 increments the frequency count corresponding to the auscultation position (1) by one. Then, when there is at least one auscultation observation describing presence of an abnormal sound in the auscultation observations recorded for the auscultation positions (2) to (12), the analysis object lung sound acquisition means 162 increments the frequency count corresponding to the auscultation positions (2) to (12) by one. Then, the analysis object lung sound acquisition means 162 focuses on the auscultation information 1527 whose auscultation date/time is immediately before the date/time of discharge from hospital, and performs the same operation as that performed using the auscultation information 1527 of the date/time of discharge from hospital on the frequency count of each of the auscultation positions (1) to (12). Thereafter, the analysis object lung sound acquisition means 162 repeats the above-described operation until the processing performed on the predetermined number of auscultation information 1527 ends or until the processing performed on the oldest auscultation information 1527 recorded in the lung sound record 152 ends, whichever earlier. Then, the analysis object lung sound acquisition means 162 determines the value of the frequency count of each of the auscultation positions (1) to (12) to be the abnormal sound appearance frequency of each of the auscultation positions (1) to (12).

Then, the analysis object lung sound acquisition means 162 determines the sequence (order) of the auscultation positions for auscultating the lung sounds from the patient A, on the basis of the abnormality frequency of each of the auscultation positions (1) to (12) of the patient A (step S22). When there is a difference in the occurrence frequency of abnormal sounds such as rales among the auscultation positions (1) to (12) of the patient A, it means that the patient A has an auscultation position where an abnormal sound is likely to occur relatively and an auscultation position where an abnormal sound is not likely to occur. Therefore, by performing auscultation according to the sequence of the auscultation positions on the basis of the past abnormality frequency of the auscultation positions (1) to (12) of the patient A, even if auscultation is interrupted for any reason such as circumstances of the patient A, and the heart failure condition of the patient A is to be determined based on the analysis result of the lung sound data of some auscultation positions in which auscultation has been performed, it is possible to reduce the probability of overlooking exacerbation of the heart failure.

The analysis object lung sound acquisition means 162 may determine the sequence of the auscultation positions only based on the abnormality frequency of each auscultation position of the patient A. In that case, the analysis object lung sound acquisition means 162 may determine the result of sorting the auscultation positions in the descending order (order from the highest to the lowest) of abnormality frequency to be the sequence of the auscultation positions. In the case where the abnormality frequency of each of the auscultation positions (1) to (12) of the patient A is as illustrated in FIG. 9, an example of sequence of the auscultation positions based on the result of sorting the auscultation positions in the descending order of the abnormality frequency is as illustrated in an auscultation sequence 1 of FIG. 9. In the auscultation sequence 1, the auscultation position (11) in which the abnormality frequency is 4, that is, the largest, is auscultated first. The auscultation positions whose abnormality frequency is the second largest are auscultation positions (6) and (12) in which the abnormality frequency is 3. Since there is no difference in the abnormality frequency, in the auscultation sequence 1, the auscultation position (12) in the anterior side of the chest that is the same as the first one, is set to be the second, and the auscultation position (6) in the posterior side of the chest is set to be the third. Thereafter, the sequence of the auscultation positions is set to (5), (9), (10), (7), (1), (2), (3), (4), and (8) in the similar manner.

By determining the sequence of the auscultation positions only based on the abnormality frequency of each auscultation position of the patient as described above, it is possible to acquire the lung sound data in order from an auscultation position having higher probability of abnormal lung sound. However, depending on the distribution of abnormality frequencies, auscultation on the anterior side of the chest and auscultation on the posterior side of the chest must be changed some times, which may cause a burden on the patient and the operator.

Therefore, it is possible to determine the sequence of the auscultation positions while considering not only the abnormality frequency of each auscultation position of the patient but also reduction of a burden on the patient and the operator. For example, the analysis object lung sound acquisition means 162 determines that a side where an auscultation position having the highest abnormality frequency is present, of the posterior side of the chest and the anterior side of the chest, to be a site that is auscultated first, and determine the side opposite to such a site to be a site that is auscultated next. Further, the analysis object lung sound acquisition means 162 determines, for each site, a result of sorting the abnormality frequencies of all auscultation positions of the site in the descending order to be the sequence of the auscultation positions of the site. An example of the auscultation sequence determined by this determination method will be shown as an auscultation sequence 2 in FIG. 9.

In the auscultation sequence 2, the anterior side of the chest where the auscultation position (11) whose abnormality frequency is 4, that is, the largest, is present is determined to be the site to be auscultated first, and the sequence of the auscultation positions (7) to (12) in the anterior side of the chest is determined to be a sequence of the auscultation positions (11), (12), (9), (10), (7), and (8), in accordance with the result of sorting the auscultation sequence in the descending order of the abnormality frequency. Further, in the auscultation sequence 2, after completion of auscultation of all auscultation positions on the anterior side of the chest, auscultation is switched to the posterior side of the chest, and the sequence of the auscultation positions (1) to (6) in the posterior side of the chest is determined to be a sequence of the auscultation positions (6), (5), (1), (2), (3), and (4), in accordance with the result of sorting the auscultation sequence in the descending order of abnormality frequency.

Referring to FIG. 8 again, the analysis object lung sound acquisition means 162 focuses on the first auscultation position in the sequence (step S23). Then, the analysis object lung sound acquisition means 162 acquires digital time-series acoustic signals including the lung sounds of the focused auscultation position from the electronic stethoscope 11 (step S24). At that time, the analysis object lung sound acquisition means 162 may display, on the screen display unit 14, a guidance screen for giving guidance on the focused auscultation position to the operator using the electronic stethoscope 11 to support acquisition of the lung sounds. Moreover, the analysis object lung sound acquisition means 162 may play a guidance sound, from a loudspeaker not illustrated, for giving guidance on the focused auscultation position to the operator using the electronic stethoscope 11 to support acquisition of the lung sounds. In this way, the analysis object lung sound acquisition means 162 gives guidance on the auscultation position to which the electronic stethoscope 11 should be applied, to the operator by using an image or a sound, and acquires digital time-series acoustic signals including lung sounds of the guided auscultation position from the electronic stethoscope 11.

Then, the analysis object lung sound acquisition means 162 measures the quality of the acquired lung sounds (step S25). In general, time-series acoustic signals output from the electronic stethoscope 11 include lung sounds of the patient A in the frequency band of 100 Hz to about 2 kHz, and the background noise (stationary noise) is also included in the same frequency band. For example, environment sounds, person's voice, metal noise, and the like entering from the outside through the body of the patient A or through the gap between the skin of the patient A and the chest piece are examples of the stationary noise. When the intensity of the lung sounds in the time-series acoustic signals is small and the intensity of the background noise is large, it is difficult to detect abnormality in the lung sounds. Therefore, the analysis object lung sound acquisition means 162 first uses a bandpass filter to extract time-series acoustic signals in the frequency band of 100 Hz to about 2 kHz from the time-series acoustic signals output from the electronic stethoscope 11. Then, the analysis object lung sound acquisition means 162 calculates the intensity of the lung sounds and the intensity of the background noise in the extracted time-series acoustic signals, and calculates the difference degree thereof as an index value of the quality of the lung sounds. Hereafter, a method of calculating an index value of quality of lung sounds will be described.

Figure 10:
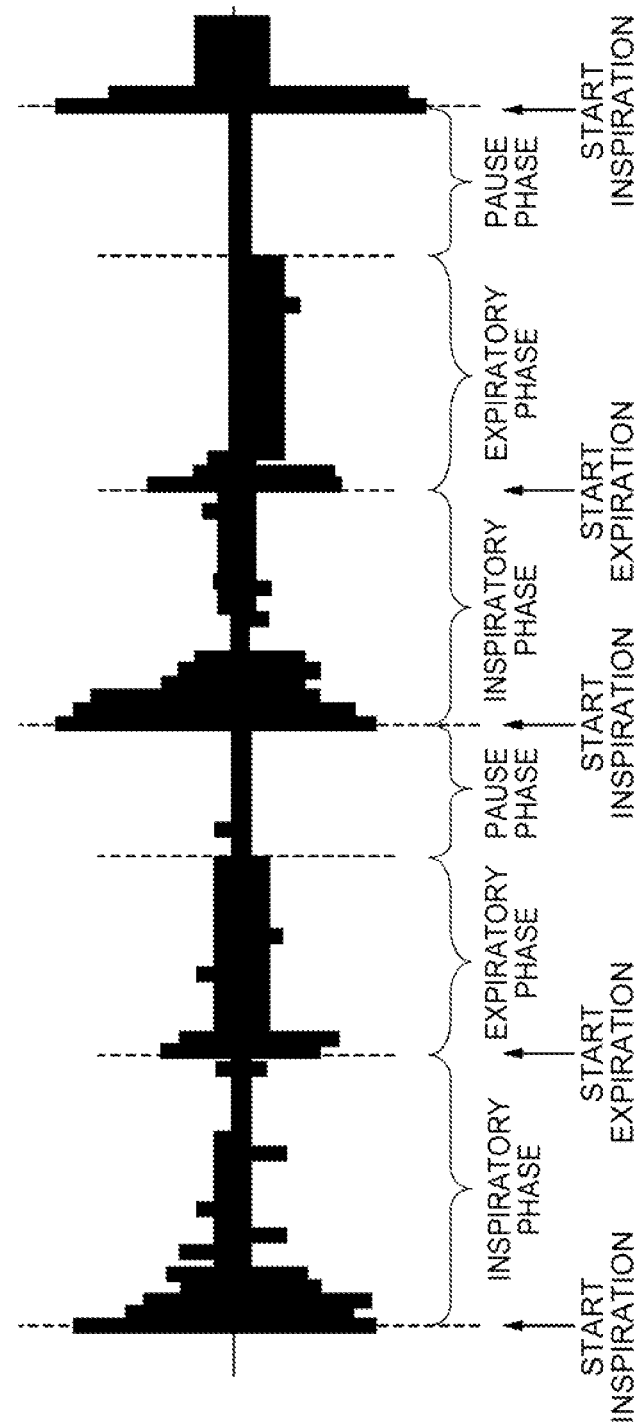
FIG. 10 is a schematic diagram illustrating a waveform of time-series acoustic signals including lung sounds output from an electronic stethoscope in the first exemplary embodiment of the present invention.

FIG. 10 is a schematic diagram illustrating an exemplary waveform of time-series acoustic signals including lung sounds output from the electronic stethoscope 11. In general, lung sounds include tracheal breath sounds, bronchial vesicular breath sounds, bronchial breath sounds, and vesicular breath sounds. FIG. 10 is a schematic diagram illustrating lung sounds that are exemplary vesicular breath sounds heard on almost all chest wall, that is, at all auscultation positions (1) to (12). Referring to FIG. 10, in the time-series acoustic signals including lung sounds, the amplitude largely varies at the start of inspiration. Moreover, at the start of expiration, the amplitude also largely varies although it is less than that at the start of inspiration. Therefore, the analysis object lung sound acquisition means 162 compares the time-series acoustic signals with a threshold T1 with which amplitude variation at the start of inspiration can be determined, and detects the point of time when the amplitude of the time-series acoustic signals becomes larger than the threshold T1 as the inspiration start time. Further, the analysis object lung sound acquisition means 162 sets the start time of inspiration up to the start time of the next inspiration to be a section of one breathing cycle, compares the amplitude of the time-series acoustic signals in the section with a threshold T2 (<T1) with which amplitude variation at the start of expiration can be determined, and detects the point of time when the amplitude of the time-series signals becomes larger than the threshold T2 as the expiration start time. Here, for merely distinguishing a pause phase from the other phases, it is only necessary to detect the start of inspiration. However, in the present invention, a phase other than the pause phase is further divided into an inspiratory phase and an expiratory phase. Therefore, the start of expiration is also detected.

In general, it is known that breathing of a person is configured of an inspiratory phase of about one second and an expiratory phase of about one second, and a pause phase of about one to one and a half seconds until the next inspiration. That is, there is a pause phase during which neither inspiration nor expiration is made, immediately before the inspiration start point of time. The analysis object lung sound acquisition means 162 detects a predetermined period (for example, one second) immediately before the detected inspiration start point of time as a pause phase. Then, the analysis object lung sound acquisition means 162 calculates the intensity of the time-series acoustic signals in the pause phase as the intensity of the background noise. As the intensity of the time-series acoustic signals, a root-mean-square of the amplitude value may be used for example. However, it is not limited thereto, and may be an amplitude or the like. Further, the analysis object lung sound acquisition means 162 calculates a value obtained by subtracting the intensity of the background noise from the intensity of the time-series acoustic signals in the inspiratory phase and/or expiratory phase, as the intensity of the lung sounds. Then, the analysis object lung sound acquisition means 162 uses the ratio of the calculated intensity of the lung sounds to the intensity of the background noise, as an index value of the lung sound quality. Note that an index value of the lung sound quality is not limited to that described above. It is also possible to use an S/N ratio calculated from the intensity of the lung sounds and the intensity of the background noise as an index value.

In the examples described above, a method of detecting a pause phase has been described by using vesicular breath sounds as an example. However, at auscultation positions of the middle lung field and the upper lung field, bronchial vesicular breath sounds are also heard together with the vesicular breath sounds. However, in the bronchial vesicular breath sounds, the amplitude of inspiration is equal to or larger than the amplitude of the expiration. Therefore, even in the case where the bronchial vesicular breath sounds are heard together with the vesicular breath sounds, it is possible to detect inspiration start timing and expiration start timing by the method as described in FIG. 10. However, when the bronchial vesicular breath sounds are similar to the trachea breath sounds, the amplitude may be larger at the time of expiration than that at the time of inspiration. Therefore, when the bronchial vesicular breath sounds are similar to the trachea breath sounds, inspiration and expiration may be reversed in the method described in FIG. 10. Specifically, detection may be performed as described below, for example.

First, the frequency in which the amplitude of the frequency spectrum of auscultated lung sounds becomes maximum is compared with a predetermined threshold frequency. Then, when the frequency in which the amplitude of the frequency spectrum of the auscultated lung sounds becomes maximum is equal to or higher than the threshold frequency, it is determined that the bronchial vesicular breath sounds included in the lung sounds are similar to the trachea breath sounds, and the start timing of inspiration and the start timing of expiration are detected by reversing inspiration and expiration in the method described in FIG. 10. On the contrary, when the frequency in which the amplitude of the frequency spectrum of the auscultated lung sounds becomes maximum is lower than the threshold frequency, it is determined that the bronchial vesicular breath sounds included in the lung sounds are not similar to the trachea respiration sounds, and the start timing of inspiration and the start timing of expiration are detected by the method described in FIG. 10. The threshold frequency is a threshold with which whether or not the bronchial vesicular breath sounds included in the lung sounds are similar to the trachea breath sounds can be distinguished. For example, the threshold frequency can be determined previously from the frequency band between the frequency in which the amplitude of the frequency spectrum of the vesicular breath sounds becomes maximum and the frequency in which the amplitude of the frequency spectrum of the trachea breath sounds becomes maximum that is higher than that. Further, instead of the "frequency in which the amplitude of the frequency spectrum becomes maximum", "spectrum center of gravity" used as a measure of representing the spectrum shape may be used.

Further, in the example described above, the start time of expiration and the start time of inspiration are detected from the time-series acoustic signals output from the electronic stethoscope 11, and a predetermined period of time immediately before the detected start point of inspiration is detected as a pause phase. However, the method of detecting an inspiratory phase, an expiratory phase, and a pause phase is not limited to that described above. For example, the analysis object lung sound acquisition means 162 may be configured to acquire estimated probabilities of an inspiratory phase, an expiratory phase, and a pause phase for each section from a learning model, by inputting time-series acoustic signals including the lung sounds of the patient A into the learning model having been learned through machine learning for estimating which section of the time-series acoustic signals including the lung sounds output from the electronic stethoscope is an inspiratory phase, an expiratory phase, or a pause phase. The learning model can be generated in advance through machine learning using a machine learning algorism such as a neural network by using time-series acoustic signals including various lung sounds as teacher data. Further, the analysis object lung sound acquisition means 162 may detect breath timing such as the start of inspiration and the start of expiration of the patient A from those other than the time-series acoustic signals output from the electronic stethoscope. For example, the analysis object lung sound acquisition means 162 may detect the breath timing of the patient A by using a breath amount sensor such as a lung tachograph or a breath band for detecting a shape change of the chest or abdominal region due to the breathing action by a sensor.

Then, the analysis object lung sound acquisition means 162 compares the index value of the quality of the lung sounds with a quality threshold set in advance (step S26). Then, when the index value of the quality of the lung sounds is smaller than the threshold, the analysis object lung sound acquisition means 162 displays, on the screen display unit 14, warning indicating that the quality of the lung sounds at the auscultation position auscultated by the electronic stethoscope 11 is bad (step S27). The operator who recognizes the warning performs an operation to obtain the lung sounds of the focused auscultation position by the electronic stethoscope 11 again, after taking measures to decrease the background noise or increase the lung sounds (step S28). As measures to reduce the background noise, it is considerable to close the window to make the room silent, put on the chest piece closely to the skin of the patient A so as to prevent environmental sounds from entering from the gap between the skin of the patient A and the chest piece, and the like. Further, as measures to increase the lung sounds, it is considerable to instruct the patient A to breathe more largely. At that time, it is also possible to instruct the breath timing to the patient A by the method as described in Patent Literature 9 for example. Then, the analysis object lung sound acquisition means 162 returns to the processing of step S25 and repeats the same processing as that described above.

On the contrary, when the index value of the quality of the lung sounds is equal to or larger than the threshold, the analysis object lung sound acquisition means 162 removes the period of pause phase and the background noise from the digital time-series acoustic signals including the lung sounds of the focused auscultation position, and stores, in the analysis object lung sound information 153, the digital time-series acoustic signals after the removal of the period of the pause phase and the background noise, in association with the focused auscultation position (step S29). Removal of the period of pause phase and the background noise is performed as described below.

First, the analysis object lung sound acquisition means 162 divides the digital time-series acoustic signals including the lung sounds of the focused auscultation position into a section configured of an inspiratory phase and an expiratory phase immediately thereafter (hereinafter referred to as an inspiratory/expiratory section) and a section of a pause phase (hereinafter referred to as a pause section). Then, the analysis object lung sound acquisition means 162 calculates the frequency spectrum of the inspiratory/expiratory section and the pause section by applying fast Fourier transform (FFT) to the digital time-series acoustic signals in each of the inspiratory/expiratory section and the pause section. Then, the analysis object lung sound acquisition means 162 subtracts the frequency spectrum of the pause section from the frequency spectrum of the inspiratory/expiratory section. By the subtraction, the background noise included in the inspiratory phase and the expiratory phase is suppressed. Then, the analysis object lung sound acquisition means 162 applies inverse frequency transform to the frequency spectrum of the inspiratory/expiratory section to thereby generate digital time-series acoustic signals after the removal of the noise in the inspiratory/expiratory section. Then, the analysis object lung sound acquisition means 162 records the generated digital time-series acoustic signals after the removal of the noise in the inspiratory/expiratory section, in the analysis object lung sound information 153 in association with the focused auscultation position. Note that the analysis object lung sound acquisition means 162 may remove the period of pause phase from the digital time-series acoustic signals including the lung sounds of the focused auscultation position and not remove the background noise. In that case, the analysis object lung sound acquisition means 162 divides the digital time-series acoustic signals including the lung sounds of the focused auscultation position into two, that is, the inspiratory/expiratory section and the pause section, and records the digital time-series acoustic signals of the inspiratory/expiratory section in the analysis object lung sound information 153 in association with the focused auscultation position.

Then, the lung sound abnormality detection means 163 detects abnormality in the lung sounds from the lung sound data recorded in the analysis object lung sound information 153 in association with the focused auscultation position, and records the detection result in the analysis object lung sound information 153 in association with the focused auscultation position (step S30). Detection of abnormality in the lung sounds will be performed as described below.

First, the lung sound abnormality detection means 163 inputs the lung sound data into the normal model 171 previously generated and stored corresponding to the focused auscultation position, and acquires the probability that the lung sound data is abnormal lung sounds from the normal model 171. Then, when the used normal model 171 is the type 1, the lung sound abnormality detection means 163 compares the probability of abnormal lung sounds with a preset threshold, and when the probability exceeds the threshold, the lung sound abnormality detection means 163 determines that the lung sound data is abnormal lung sounds, while when the probability is equal to or lower than the threshold, determines that the lung sounds data is normal lung sounds. On the other hand, when the used normal model 171 is the type 2, the lung sound abnormality detection means 163 compares the probability of abnormal lung sounds with the preset threshold, and when the probability is equal to or lower than the threshold, the lung sound abnormality detection means 163 determines that the lung sounds are abnormal lung sounds of the same type as that at the time of discharge from hospital, while when the probability exceeds the threshold, determines that the lung sound data is either abnormal lung sounds of a type different from that at the time of discharge from hospital or normal lung sounds. The reason of including normal lung sounds in the determination result is that even in the case where the symptom is improved after discharge from hospital due to medication or the like and the lung sounds that were abnormal at the time of discharge from hospital become normal at the time of analysis, the lung sounds deviate from the normal model of the type 2.

Each time abnormality detection of lung sound data of the focused auscultation position is performed by the lung sound abnormality detection means 163, the analysis result output means 164 displays the abnormality detection result on the screen display unit 14 (step S31). Thereby, the operator can immediately recognize whether or not the lung sound data of the auscultation position is abnormal lung sounds, at the time of auscultation.

Upon completion of acquisition and analysis of the lung sound data of the focused auscultation position, the analysis object lung sound acquisition means 162 determines whether or not acquisition and analysis of lung sound data have been completed for all auscultation positions (step S32). When there remains any auscultation position in which acquisition has not been completed, the analysis object lung sound acquisition means 162 moves the focus to the next auscultation position in the sequence (step S33), and returns to step S24 and repeats the same processing as that described above.

When acquisition and analysis of lung sound data of all auscultation positions have been completed, the analysis object lung sound acquisition means 162 ends the processing of FIG. 8. The analysis object lung sound acquisition means 162 may end the processing of FIG. 8 before acquisition and analysis of lung sound data of all auscultation positions have been completed due to the circumstances or the like of the patient A. When the processing of FIG. 8 is terminated, the lung sound information 1534 in the analysis object lung sound information 153 corresponding to the auscultation position in which acquisition and analysis of lung sound data have not been performed still has a Null value.

Next, the details of step S13 of FIG. 7 to calculate the emergency level 1535 will be described.

The lung sound abnormality detection means 163 determines the severity of the heart failure of the patient A on the basis of the analysis result of the lung sound data of each auscultation position, and calculates the emergency level 1535 based on the determined severity. When determining the severity of the heart failure, the lung sound abnormality detection means 163 determines the severity of the heart failure with reference to a determination table for determining the severity of the heart failure from the analysis result of the lung sound data of each auscultation position.

FIG. 11 illustrates an example of the determination table. The determination table illustrated in FIG. 11 includes a column corresponding to each of the auscultation positions (1) to (12) one to one, and a row corresponding to a degree of severity one to one, and at an intersection between a column and a row, a + sign indicating that there is abnormality in the lung sounds and a − sign indicating that there is no abnormality in the lung sounds are set. Referring to FIG. 11, in the determination table, when there is no abnormality in the lung sounds of any auscultation position, it is determined that the severity is 0. Further, in the determination table, when there is abnormality in the lung sounds at at least one of the auscultation positions (11) and (12) set in the lower lung field in the anterior side of the chest and there is no abnormality in the lung sounds at the other auscultation positions (1) to (10), it is determined that the severity is 1. Further, in the determination table, when there is abnormality in the lung sounds at both the auscultation positions (11) and (12), there is abnormality in the lung sounds at either one of the auscultation positions (5) and (6) set in the lower lung field of the posterior side of the chest, and there is no abnormality in the lung sounds in the other auscultation positions (1) to (4) and (7) to (10), it is determined that the severity is 2. The severity N set in the last row means that there is abnormality in the lung sounds at all auscultation positions (1) to (12). In FIG. 11, although description of one or more degrees of severity are omitted between the severity 2 and the severity N, auscultation positions having abnormality in the lung sounds and auscultation position not having abnormality in the lung sounds are also set for them. In one or more degrees of severity between the severity 2 and the severity N, the number of auscultation positions at which there is abnormality in the lung sounds is four or larger and less than twelve, and the number increases as closer to the severity N.

In the determination table illustrated in FIG. 11, the severity of heart failure is classified into N+1 classes from severity 0 to severity N, depending on the combination of presence or absence of abnormality in the lung sounds at the auscultation positions (1) to (12). Here, the severity 0 is a state where no abnormal lung sound is heard. Therefore, it can be said that heart failure is remitted. The severity 1 is a condition where abnormal lung sounds are heard only in the lower lung field of the anterior side of the chest. Therefore, heart failure is mild although not remitted, and is a condition in which some patients are discharged from hospital in such a condition. The severity 2 is a condition where abnormal lung sounds are heard in one of the lower lung fields of the posterior side of the chest in addition to the lower lung field of the anterior side of the chest. Therefore, it can be said that it is severe than the severity 1. However, it still belongs to the mild case, so there is a high possibility of preventing re-hospitalization if appropriate treatment is taken at this point.

The determination table in which the severity of heart failure is determined from the analysis result of the auscultation position is not limited to that illustrated in FIG. 11. For example, it is known that when rales are heard only at the end of inspiration, it is mild, and when the rales are heard immediately after the start of inspiration, it is severe. Therefore, in addition to presence or absence of abnormal lung sounds at each auscultation position, the timing that the abnormal lung sounds are heard may be added to the determination table, and the severity of the heart failure may be determined according to a combination of an auscultation position, presence or absence of abnormal lung sounds, and the timing that the abnormal lung sounds are heard.

Further, the lung sound abnormality detection means 163 may determine the severity of the heart failure of the patient A from the number of auscultation positions where the abnormal lung sounds are heard, regardless of the auscultation position. For example, the lung sound abnormality detection means 163 may determine the severity to be 0, 1, 2, 3, or 4 (maximum) when the number of auscultation positions where abnormal lung sounds are heard is 0, 1 to 2, 3 to 4, 5 to 8, or 9 or more, respectively.

Further, when the processing illustrated in FIG. 8 is terminated due to circumstances or the like of the patient A so that at least part of the analysis results in the lung sound information 1534 of the respective auscultation positions has a NULL value, the lung sound abnormality detection means 163 performs the processing as described below. First, the lung sound abnormality detection means 163 determines whether or not the following condition is satisfied: the number of auscultation positions in which the analysis result has a Null value, that is, lung sound data is not acquired and analysis of whether or not the lung sounds are abnormal lung sounds has not been performed, is less that a first threshold set in advance. In other words, the lung sound abnormality detection means 163 determines whether or not the following condition is satisfied: the number of auscultation positions in which the lung sound data is acquired and analysis of whether or not the lung sounds are abnormal lung sounds has been performed, is equal to or larger than a second threshold set in advance. Here, the first threshold and the second threshold may be fixed values or variable values corresponding to the condition of the patient at the time of discharge from hospital. In the case of fixed values, the first threshold may be 4 or smaller and the second threshold may be 8 or larger, for example. In the case of variable values, for the patient who is discharged from hospital with no abnormal lung sound in any auscultation position, the first threshold may be 10 or smaller and the second threshold may be 2 or larger for example, and for the other patients, the values may be the same as the fixed values. Then, when the condition is not satisfied, the lung sound abnormality detection means 163 does not calculate the severity (and does not calculate the emergency level accordingly), and ends the current lung sound analysis in error and displays the fact on the screen display unit 14. This is because not to provide erroneous information to the operator and the like.

On the contrary, when the condition is satisfied, the lung sound abnormality detection means 163 assumes that no abnormal lung sound is detected at auscultation positions in which analysis of whether or not abnormal lung sounds are heard has not been performed, and calculates the severity. Then, the lung sound abnormality detection means 163 holds the calculated severity as the most optimistic value. That is, when the calculated severity is the severity 1, it is not held as "severity 1" but held as "severity 1 or higher" or "at least severity 1". For example, it is assumed that the patient A is discharged from hospital in a condition that no abnormal lung sound is heard in any auscultation position, and acquisition and analysis of lung sound data is performed on only two positions, that is, the auscultation positions (11) and (12), and abnormal lung sounds are detected at at least one of the auscultation positions. In that case, the lung sound abnormality detection means 163 assumes that no abnormal lung sound is detected at the other auscultation positions (1) to (10), determines the severity to be the severity 1 based on the determination table of FIG. 11, and accordingly determines to be "severity 1 or higher".

When determining the severity of the heart failure on the analysis result of the lung sound data of each auscultation position as described above, the lung sound abnormality detection means 163 determines the emergency level 1535 from the determined severity. For example, the lung sound abnormality detection means 163 may determine the emergency level 1535 only based on the severity 0 to N of the heart failure. That is, the lung sound abnormality detection means 163 may set the range that can be taken by the emergency level 1535 to be N+1 classes from the emergency level 0 to the emergency level N, and determine an emergency level i that corresponds to the determined severity i (i=0 to N) of the heart failure one to one.

Further, the lung sound abnormality detection means 163 may determine the emergency level 1535 on the basis of the severity 0 to N of the heart failure and the condition of the patient A. For example, as the condition of the patient A, whether or not the weight is increased by a certain quantity in a unit period (for example, 3 kg or more in a week), presence or absence of subjective symptoms such as edema, cough, anorexia, or the like, whether or not the pulse exceeds a prescribed number, and the like may be considered. Then, the lung sound abnormality detection means 163 may set the emergency level that is obtained by correcting the emergency level determined based on the severity of the heart failure to be higher according to the condition of the patient A, as a final emergency level. For example, when a weight increase is observed although the emergency level determined from the severity of the heart failure is the emergency level 0 or 1, the lung sound abnormality detection means 163 may increase the emergency level to be 1 or 2. However, the upper limit of the emergency level after the correction is N.

Next, description will be given on an operation after an email, to which the analysis object lung sound information 153 is attached as a file, is sent to the contact email address 1526 by the analysis result output means 164.

In the hospital or the like that received the email, the analysis object lung sound information 153 stored in the attached file is analyzed by a medical specialist of heart failure. The analysis object lung sound information 153 is not limited to be attached as a file but may be in a form to be shared with a medical specialist of heart failure in SaaS format by posting a link or the like. For example, a medical specialist replays the lung sound data of each auscultation position recorded in the analysis object lung sound information 153 by a personal computer or the like, and diagnoses whether or not adventitious sounds such as rales are found from the lung sounds of the patient A. Then, the medical specialist creates auscultation observations on the lung sound data of respective auscultation positions, and records them in the analysis object lung sound information 153. The analysis object lung sound information 153 in which the auscultation observations of the medical specialist are recorded is returned to the lung sound analysis device 10, that is, the source, by means of a communication means such as an email. Hereinafter, analysis object lung sound information in which the auscultation observations by a medical specialist are recorded is referred to as analysis object lung sound information with auscultation observations. FIG. 12 illustrates an exemplary configuration of the analysis object lung sound information 153 with auscultation observations.

The lung sound abnormality detection means 163 updates the original analysis object lung sound information 153 recorded in the storage unit 15, according to the analysis object lung sound information 153 with auscultation observations received via the communication I/F unit 12 of the lung sound analysis device 10. Then, when there is the type-2 normal model in the normal models of the patient A, the lung sound abnormality detection means 163 checks whether or not the auscultation observations, recorded in the lung sound information of the auscultation position corresponding to the type-2 normal model, include normal lung sound data in which adventitious sounds such as rales are not included in the lung sound data. Then, the lung sound abnormality detection means 163 learns the type-1 normal model by using the normal lung sound data that is confirmed as normal. Then, the type-1 normal mode, obtained through leaning, is used thereafter, instead of the type-2 normal model having been used. In this way, even for the auscultation position in which learning cannot be performed as an original normal model because of lack of normal lung sounds at the time of discharge from hospital, it is possible to detect lung sound abnormality by using the original normal model immediately, when any improvements can be seen in the symptom.

As described above, according to the present embodiment, time-series acoustic signals including the lung sounds of the patient A are divided into those in a period of inspiratory phase, those in a period of expiratory phase, and those in a period of pause phase, and abnormality in the lung sounds is detected from the time-series acoustic signals in the inspiratory phase and the expiratory phase while excluding the period of pause phase. Therefore, abnormality in the lung sounds can be detected without being affected at all by the noise included in the period of pause phase.

Further, according to the present embodiment, background noise is detected from the time-series acoustic signals in the period of pause phase, the background noise is removed from the time-series acoustic signals including the lung sounds of the patient A in the period of inspiratory phase and the period of expiratory phase, and abnormality in the lung sounds is detected from the time-series acoustic signals in the periods of inspiratory phase and expiratory phase after the removal of the background noise. Therefore, abnormality in the lung sounds can be detected without being affected by the background noise.

In the above description, the lung sound abnormality detection means 163 uses an abnormality detection method in which only normal sounds are learned in advance and sounds not falling under such a range are detected as abnormal sounds. However, the lung sound abnormality detection means 163 may detect abnormality in the lung sounds by using a method other than the abnormality detection method described above. For example, the lung sound abnormality detection means 163 may use an abnormality detection method by using supervised learning in which abnormal sounds such as coarse crackles and fine crackles that are discontinuous rales and wheezes and rhonchi that are continuous rales are learned in advance and such sounds are detected.

For example, as supervised learning, the lung sound abnormality detection means 163 may create a model that learned the features of input sound data (input data) and criteria by using deep learning with respect to a database in which abnormal sounds are collected for example, and perform detection by checking whether or not the input data conforms to the model at the time of detection. The lung sound abnormality detection means 163 can use, for leaning and input data for example, a spectrum program in which sounds are applied with FFT or log-FFT for each certain section to be aligned in a time-series manner, and for deep learning, use recurrent neural network (RNN) or convolutive neural network (CNN).

Further, the lung sound abnormality detection means 163 may use a method in which a lung sounds waveform is transformed into a short-time feature amount such as zero-cross coefficient or mel-frequency cepstral coefficient (MFCC), and abnormal sounds are detected by machine learning. For example, the lung sound abnormality detection means 163 may perform modeling by mixed Gaussian distribution (GMM) at the time of learning, and check conformity with the model at the time of detection. Further, the lung sound abnormality detection means 163 may learn the identification surface of an identifier such as a support vector machine (SVM) and uses the identifying surface to identify whether or not the input data corresponds to the abnormal sounds. The lung sound abnormality detection means 163 may generate the feature amount by using the data itself like non-negative matrix factorization (NMF) or principal component analysis (PCA), other than the method of directly calculating the feature amount as described above.

Further, the lung sound abnormality detection means 163 may detect abnormal sounds by the decision tree using statistical features of an input waveform such as long-time power distribution of input signals, distribution of component amount/component ratio of a specific frequency bin range, or the like. In that case, as items of the decision tree, the lung sound abnormality detection means 163 may use statistical features (for example, when a process frame larger than $3\sigma$ is generated by Gaussian approximation), rather than a direct value (for example, when the power exceeds 20 mW for three consecutive frames). Further, the lung sound abnormality detection means 163 may detect abnormal sounds by not using the input signal itself but modeling it through auto-regression (AR) process or the like and detecting abnormal sounds when some of the model parameters exceed a threshold. These methods may not include a learning process, but include observations of abnormal sounds that are object signals in the configuration of the decision tree or determination of a threshold. Therefore, they are included in supervised learning for the sake of convenience.

Second Exemplary Embodiment

Figure 13:
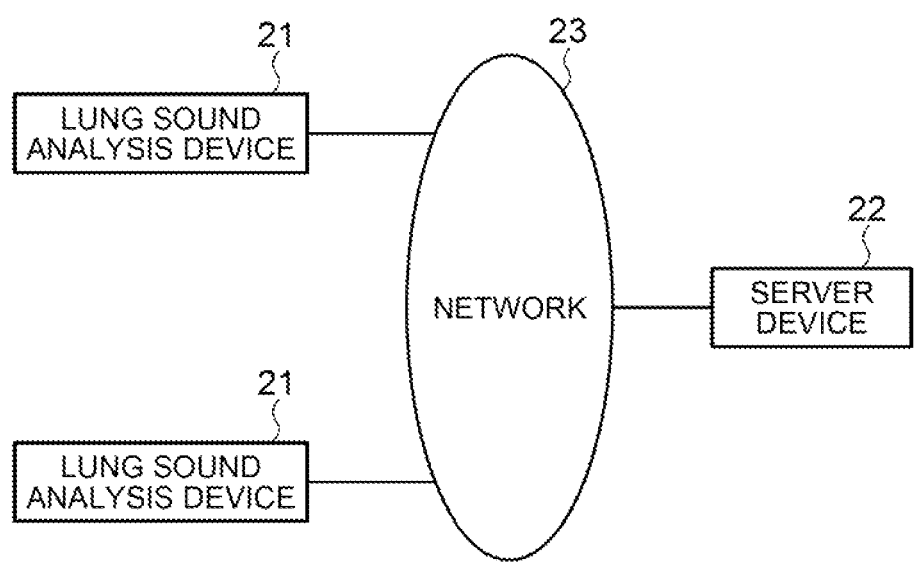
FIG. 13 is a block diagram of a lung sound analysis system according to a second exemplary embodiment of the present invention.

FIG. 13 is a block diagram of a lung sound analysis system 20 according to a second exemplary embodiment of the present invention. Referring to FIG. 13, the lung sound analysis system 20 is configured of a plurality of lung sound analysis devices 21 and a server device 22. The lung sound analysis devices 21 and the server device 22 are communicably connected with each other over a network such as the Internet.

The lung sound analysis device 21 is an information processing device that acquires and analyzes lung sounds from a patient who received treatment for heart failure and discharged from hospital. The lung sound analysis device 21 may be a smartphone, a tablet terminal, a PDA, a laptop personal computer, or the like, but is not limited thereto. The lung sound analysis device 21 includes an electronic stethoscope, a communication I/F unit, an operation input unit, a screen display unit, a storage unit, and an arithmetic processing unit that are not illustrated.

The server device 22 is a computer that provides, to the lung sound analysis devices 21, various services required for lung sound analysis over the network 23. For example, the server device 22 stores therein at least part of the lung sound record 152, the analysis object lung sound information 153, and the program 151 illustrated in FIG. 1, and provides the lung sound analysis devices 21 with them over the network 23. Therefore, the lung sound analysis device 21 is not needed to store at least part of the lung sound record 152, the analysis object lung sound information 153, and the program 151 in the storage unit 15 as compared with the lung sound analysis device 10 of FIG. 1, so that the memory capacity can be reduced.

The server device 22 also provides the lung sound analysis device 21 with at least part of the functions of the lung sound record acquisition means 161, the analysis object lung sound acquisition means 162, the lung sound abnormality detection means 163, and the analysis result output means 164 illustrated in FIG. 1, over the network 23. That is, the server device 22 executes at least part of the processing of steps S1 to S2 of FIG. 5, steps S11 to S14 of FIG. 7, and steps S21 to S33 of FIG. 8, on behalf of the lung sound analysis device 21. Therefore, in the lung sound analysis device 21, the configuration of the arithmetic processing unit 16 can be simplified as compared with the lung sound analysis device 10 of FIG. 1.

Third Exemplary Embodiment

Figure 14:
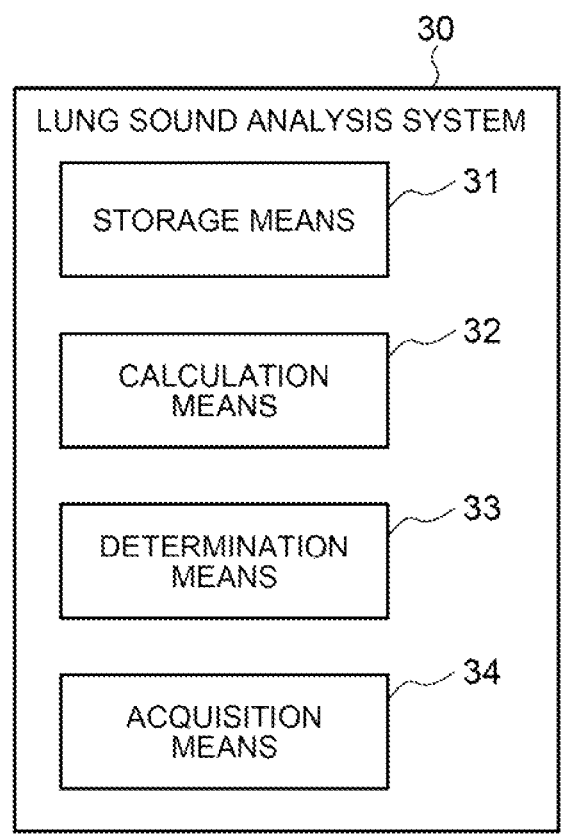
FIG. 14 is a block diagram of a lung sound analysis system according to a third exemplary embodiment of the present invention.

FIG. 14 is a block diagram of a lung sound analysis system 30 according to a third exemplary embodiment of the present invention. Referring to FIG. 14, the lung sound analysis system 30 is configured of a storage means 31, a calculation means 32, a determination means 33, and an acquisition means 34.

The storage means 31 is configured to store therein history of auscultation observations on lung sound data of each auscultation position of a subject who is a heart failure patient. The storage means 31 may be configured as similar to the lung sound record 152 of FIG. 1 for example, but is not limited thereto.

The calculation means 32 is configured to calculate appearance frequency of abnormal sounds for each auscultation position of the subject based on the history. The calculation means 32 can be configured as described in step S21 of FIG. 8 for example, but is not limited thereto.

The determination means 33 is configured to determine the sequence of auscultation positions at which lung sounds are to be auscultated from the subject, based on the calculated appearance frequency. The determination means 33 may be configured as described in step S22 of FIG. 8 for example, but is not limited thereto.

The acquisition means 34 is configured to give guidance on the auscultation positions of the subject to the operator according to the determined sequence, and acquire time-series acoustic signals including lung sounds from the guided auscultation position. The acquisition means 34 may be configured as described in step S24 of FIG. 8 for example, but is not limited thereto.

The lung sound analysis system 30 configured as described above functions as described below. First, the storage means 31 stores therein history of auscultation observations on lung sound data of each auscultation position of a subject who is a heart failure patient. Then, the calculation means 32 calculates appearance frequency of abnormal sounds for each auscultation position of the subject based on the history. Then, the determination means 33 determines the sequence of auscultation positions at which lung sounds are to be auscultated from the subject, based on the calculated appearance frequency. Then, the acquisition means 34 gives guidance on the auscultation positions of the subject to the operator according to the determined sequence, and acquire time-series acoustic signals including lung sounds from the guided auscultation position.

According to the lung sound analysis system 30 that is configured and operates as described above, it is possible to reduce the probability that heart failure exacerbation is overlooked even when auscultation is terminated when auscultation at only some auscultation positions, among the auscultation positions, has been completed due to any reasons such as circumstances of the patient. This is because appearance frequency of abnormal sounds at each auscultation position of the subject is calculated based on the history of past auscultation observations of each auscultation position of lung sounds of the patient who is a heart failure patient, and the sequence of auscultation positions at which lung sounds are to be auscultated from the subject is determined based on the calculated appearance frequency.

While the present invention has been described with reference to the exemplary embodiments described above, the present invention is not limited to the above-described embodiments. The form and details of the present invention can be changed within the scope of the present invention in various manners that can be understood by those skilled in the art. For example, configurations as described below are also included in the present invention.

In the abnormality detection using a normal model, statistically deviated from the normal model is used as the grounds for abnormality determination. Therefore, even through rales of different characteristics (rough discontinuous rales, small continuous rales) exist in the lung sound data, it is detected that there is abnormality in the lung sounds, but the characteristics thereof are not detected. Similarly, in the abnormality detection using a normal model, abnormality in the lung sounds is detected regardless of the number of appearance of rales, but the number of rales is not detected. Meanwhile, in the abnormality detection method using the supervised learning as described above, the type and the number of abnormal sounds in the lung sounds can be detected. It has been known that when the nature of rales is small, abnormality is mild, when the nature of rales is rough, abnormality is severe, and as the number of appearance of rales is larger, the abnormality is more severe. Therefore, in the case of using the abnormality detection method using the supervised learning as described above, the type and the number of abnormal sounds may be set in the determination table illustrated in FIG. 11, and the severity of heart failure may be determined while considering the type and the number of abnormal sounds.

For example, the analysis object lung sound acquisition means may instruct the subject to breathe larger when it is determined that the lung sounds are not recorded correctly. Further, the analysis object lung sound acquisition means may instruct the operator on the auscultation position by means of augmented reality (AR) display. Further, the analysis object lung sound acquisition means may change the auscultation position on the basis of the previously registered information such as sex and the like of the subject. Further, the analysis object lung sound acquisition means may start breath instruction when it is detected that the stethoscope is put on, that is, the chest piece comes into contact with, the body of the subject. Further, the analysis object lung sound acquisition means may perform breath instruction by avatar display or voice designated by the subject. Further, when acquisition of lung sounds is not performed within a predetermined period, the analysis object lung sound acquisition means may urge acquisition of lung sounds by avatar display or voice designated by the subject.

Further, the lung sound abnormality detection means may use the detected abnormal sounds as learning data of the lung sound abnormality detection means. Further, the lung sound abnormality detection means may use data in which abnormal sound data transmitted to the server is determined by a doctor and the final determination result (normal or abnormal) by the doctor is registered in the system, as the learning data. Further, the lung sound abnormality detection means may previously acquire reference sounds at the normal time of each subject, and detect the abnormal sounds based on the reference sounds. Further, the lung sound abnormality detection means may change the model to be used for abnormality detection on the basis of previously registered information (including the weight and medication history data) of the subject and the auscultation position.

Further, the analysis result output means may display an analysis result, a lung sound record used for the analysis, and storage information including the analysis object lung sound information, on the screen display unit or the like in the time-series manner. Further, the analysis result output means may transmit information to the server even when abnormality is not detected.

INDUSTRIAL APPLICABILITY

The present invention is applicable to a system for analyzing lung sounds of a person, and in particular, applicable to a system for detecting, in an early stage, exacerbation of heart failure of a patient who received heart failure treatment and was discharged from hospital and preventing re-hospitalization.

The whole or part of the exemplary embodiments disclosed above can be described as, but not limited to, the following supplementary notes.

(Supplementary Note 1)

A lung sound analysis system comprising:
storage means for storing history of auscultation observations on lung sound data of each of auscultation positions of a subject who is a heart failure patient;
calculation means for calculating appearance frequency of abnormal sounds for each of the auscultation positions on a basis of the history;
determination means for determining sequence of the auscultation positions at which lung sounds are to be auscultated from the subject, on a basis of the calculated appearance frequency; and
acquisition means for giving guidance on the auscultation positions of the subject to an operator according to the determined sequence, and acquiring time-series acoustic signals including lung sounds from a guided auscultation position.

(Supplementary Note 2)

The lung sound analysis system according to supplementary note 1, further comprising
detection means for detecting abnormality in the lung sounds from the time-series acoustic signals including the lung sounds of each of the auscultation positions.

(Supplementary Note 3)

The lung sound analysis system according to supplementary note 2, wherein
the detection means determines severity of heart failure of the subject based on a detection result of the abnormality in the lung sounds of each of the auscultation positions.

(Supplementary Note 4)

The lung sound analysis system according to supplementary note 3, wherein
the detection means determines the severity of the heart failure of the subject on assumption that abnormality in the lung sounds was not detected for an auscultation position at which auscultation was not performed, and outputs a result of the determination as a most optimistic value.

(Supplementary Note 5)

The lung sound analysis system according to any of supplementary notes 1 to 4, wherein
the acquisition means determines a pause phase of breathing of the subject, and divides the time-series acoustic signals into time-series acoustic signals in a period of the pause phase of the subject and time-series acoustic signals in a period other than the pause phase according to a result of the determination.

(Supplementary Note 6)

The lung sound analysis system according to supplementary note 5, further comprising
detection means for detecting abnormality in the lung sounds from the time-series acoustic signals in the period other than the pause phase after the division.

(Supplementary Note 7)

The lung sound analysis system according to supplementary note 5, wherein
the acquisition means detects background noise from the time-series acoustic signals in the period of the pause phase after the division, and removes the detected background noise from the time-series acoustic signals in the period other than the pause phase after the division.

(Supplementary Note 8)

The lung sound analysis system according to supplementary note 7, further comprising detection means for detecting abnormality in the lung sounds from the time-series acoustic signals in the period other than the pause phase after the removal of the background noise.

(Supplementary Note 9)

The lung sound analysis system according to supplementary note 5, wherein the acquisition means calculates an index value representing quality of the time-series acoustic signals in the period other than the pause phase, from intensity of the time-series acoustic signals in the period of the pause phase and intensity of the time-series acoustic signals in the period other than the pause phase after the division.

(Supplementary Note 10)

The lung sound analysis system according to supplementary note 9, wherein the acquisition means gives warning based on the calculated index value.

(Supplementary Note 11)

A lung sound analysis method comprising:

storing history of auscultation observations on lung sound data of each of auscultation positions of a subject who is a heart failure patient;

calculating appearance frequency of abnormal sounds for each of the auscultation positions on a basis of the history;

determining sequence of the auscultation positions at which lung sounds are to be auscultated from the subject, on a basis of the calculated appearance frequency; and giving guidance on the auscultation positions of the subject to an operator according to the determined sequence, and acquiring time-series acoustic signals including lung sounds from a guided auscultation position.

(Supplementary Note 12)

A computer-readable medium storing thereon a program for causing a computer to execute processing to:

store history of auscultation observations on lung sound data of each of auscultation positions of a subject who is a heart failure patient;

calculate appearance frequency of abnormal sounds for each of the auscultation positions on a basis of the history;

determine sequence of the auscultation positions at which lung sounds are to be auscultated from the subject, on a basis of the calculated appearance frequency; and give guidance on the auscultation positions of the subject to an operator according to the determined sequence, and acquiring time-series acoustic signals including lung sounds from a guided auscultation position.

REFERENCE SIGNS LIST 10 lung sound analysis device
11 electronic stethoscope
12 communication I/F unit
13 operation input unit
14 screen display unit
15 storage unit
16 arithmetic processing unit
151 program
152 lung sound record
153 analysis object lung sound information
161 lung sound record acquisition means
162 analysis object lung sound acquisition means
163 lung sound abnormality detection means
164 analysis result output means

What is claimed is:

1. A lung sound analysis device comprising:
a memory containing program instructions; and
a processor coupled to the memory, wherein the processor is configured to execute the program instructions to:
store a history of auscultation observations on lung sound data of each of a plurality of auscultation positions of a subject who is a heart failure patient;
calculate an appearance frequency of abnormal sounds for each of the auscultation positions on a basis of the history;
determine a sequence of the auscultation positions at which lung sounds are to be auscultated from the subject, on a basis of the calculated appearance frequencies;
give guidance on the auscultation positions of the subject to an operator according to the determined sequence, and acquire time-series acoustic signals including lung sounds from a guided auscultation position; and
detect, using a machine leaning model, an abnormality in the lung sounds from the time-series acoustic signals including the lung sounds of each of the auscultation positions,
wherein the detecting includes:
determining a severity of heart failure of the subject based on a detection result of the abnormality in the lung sounds of each of the auscultation positions; and
determining the severity of the heart failure of the subject on assumption that abnormality in the lung sounds was not detected for an auscultation position at which auscultation was not performed, and outputting a result of the determination as a most optimistic value.

2. The lung sound analysis device according to claim 1, wherein the acquiring includes determining a pause phase of breathing of the subject, and dividing the time-series acoustic signals into time-series acoustic signals in a period of the pause phase of the subject and time-series acoustic signals in a period other than the pause phase according to a result of the determination.

3. The lung sound analysis device according to claim 2, wherein the processor is further configured to execute the instructions to detect abnormality in the lung sounds from the time-series acoustic signals in the period other than the pause phase after the division.

4. The lung sound analysis device according to claim 2, wherein the acquiring includes detecting background noise from the time-series acoustic signals in the period of the pause phase after the division, and removing the detected background noise from the time-series acoustic signals in the period other than the pause phase after the division.

5. The lung sound analysis device according to claim 4, wherein the processor is further configured to execute the instructions to detect abnormality in the lung sounds from the time-series acoustic signals in the period other than the pause phase after the removal of the background noise.

6. The lung sound analysis device according to claim 2, wherein the acquiring includes calculating an index value representing quality of the time-series acoustic signals in the period other than the pause phase, from intensity of the time-series acoustic signals in the period of the pause phase and intensity of the time-series acoustic signals in the period other than the pause phase after the division.

7. The lung sound analysis system according to claim 6, wherein the acquiring includes giving warning based on the calculated index value.

8. A lung sound analysis method comprising:
storing a history of auscultation observations on lung sound data of each of a plurality of auscultation positions of a subject who is a heart failure patient;
calculating an appearance frequency of abnormal sounds for each of the auscultation positions on a basis of the history;
determining a sequence of the auscultation positions at which lung sounds are to be auscultated from the subject, on a basis of the calculated appearance frequencies;
giving guidance on the auscultation positions of the subject to an operator according to the determined sequence, and acquiring time-series acoustic signals including lung sounds from a guided auscultation position; and
detecting, using a machine leaning model, an abnormality in the lung sounds from the time-series acoustic signals including the lung sounds of each of the auscultation positions,
wherein the detecting includes:
determining a severity of heart failure of the subject based on a detection result of the abnormality in the lung sounds of each of the auscultation positions; and
determining the severity of the heart failure of the subject on assumption that abnormality in the lung sounds was not detected for an auscultation position at which auscultation was not performed, and outputting a result of the determination as a most optimistic value.

9. A non-transitory computer-readable medium storing thereon a program comprising instructions for causing a computer to execute processing to:
store a history of auscultation observations on lung sound data of each of a plurality of auscultation positions of a subject who is a heart failure patient;
calculate an appearance frequency of abnormal sounds for each of the auscultation positions on a basis of the history;
determine a sequence of the auscultation positions at which lung sounds are to be auscultated from the subject, on a basis of the calculated appearance frequencies; and
give guidance on the auscultation positions of the subject to an operator according to the determined sequence, and acquiring time-series acoustic signals including lung sounds from a guided auscultation position; and
detect, using a machine leaning model, an abnormality in the lung sounds from the time-series acoustic signals including the lung sounds of each of the auscultation positions,
wherein the detecting includes:
determining a severity of heart failure of the subject based on a detection result of the abnormality in the lung sounds of each of the auscultation positions; and
determining the severity of the heart failure of the subject on assumption that abnormality in the lung sounds was not detected for an auscultation position at which auscultation was not performed, and outputting a result of the determination as a most optimistic value.

* * * * *